United States Patent
Nam et al.

(10) Patent No.: US 12,238,649 B2
(45) Date of Patent: Feb. 25, 2025

(54) WAKE-UP BEAM MANAGEMENT

(71) Applicant: QUALCOMM Incorporated, San Diego, CA (US)

(72) Inventors: Wooseok Nam, San Diego, CA (US); Tao Luo, San Diego, CA (US); Iyab Issam Sakhnini, San Diego, CA (US); Juan Montojo, San Diego, CA (US); Wanshi Chen, San Diego, CA (US); Junyi Li, Franklin Park, NJ (US); Olufunmilola Omolade Awoniyi-Oteri, San Diego, CA (US)

(*) Notice: Subject to any disclaimer, the term of this patent is extended or adjusted under 35 U.S.C. 154(b) by 477 days.

(21) Appl. No.: 17/196,892

(22) Filed: Mar. 9, 2021

(65) Prior Publication Data

US 2021/0289443 A1    Sep. 16, 2021

Related U.S. Application Data

(60) Provisional application No. 62/987,734, filed on Mar. 10, 2020.

(51) Int. Cl.
*H04W 52/02*   (2009.01)
*H04L 5/00*    (2006.01)
*H04W 72/044*  (2023.01)
*H04W 72/21*   (2023.01)
*H04W 74/0833* (2024.01)

(52) U.S. Cl.
CPC ....... *H04W 52/0235* (2013.01); *H04L 5/0048* (2013.01); *H04W 72/046* (2013.01); *H04W 72/21* (2023.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 11,197,338 | B2* | 12/2021 | Hsieh | H04W 56/001 |
| 2011/0269490 | A1* | 11/2011 | Earnshaw | H04L 5/0053 |
| | | | | 455/509 |
| 2016/0374022 | A1* | 12/2016 | Ang | H04W 52/0216 |
| 2018/0368083 | A1* | 12/2018 | Yang | H04B 7/0486 |

(Continued)

FOREIGN PATENT DOCUMENTS

| | | |
|---|---|---|
| CN | 110167128 A | 8/2019 |
| KR | 20190114349 A | 10/2019 |
| WO | 2020000269 A1 | 1/2020 |

OTHER PUBLICATIONS

International Search Report and Written Opinion—PCT/US2021/021728—ISA/EPO—Jun. 23, 2021.

(Continued)

*Primary Examiner* — Alpus Hsu
*Assistant Examiner* — Camquyen Thai

(57) ABSTRACT

Certain aspects of the present disclosure provide techniques for determining what resources and beams to use when monitoring for wake up signals (WUSs). Particular aspects provide a method performed by a user equipment (UE), which generally includes measuring one or more synchronization signal blocks (SSBs) transmitted from a network entity, determining one or more WUS occasions and receive (RX) beams to monitor based on the SSB measurements, and deciding to wake up for an ON duration if a WUS is detected in one of the monitored occasions.

26 Claims, 18 Drawing Sheets

(56) References Cited

U.S. PATENT DOCUMENTS

| | | | |
|---|---|---|---|
| 2018/0368142 A1* | 12/2018 | Liou | H04W 74/0808 |
| 2019/0028967 A1* | 1/2019 | Ahn | H04L 27/0008 |
| 2019/0053162 A1* | 2/2019 | Islam | H04W 52/0229 |
| 2019/0254110 A1 | 8/2019 | He et al. | |
| 2019/0327679 A1* | 10/2019 | Gupta | H04W 76/27 |
| 2020/0053637 A1* | 2/2020 | Tsai | H04L 5/001 |
| 2020/0092814 A1* | 3/2020 | Zhou | H04W 52/0235 |
| 2020/0213978 A1* | 7/2020 | Iyer | H04L 5/0078 |
| 2021/0084586 A1* | 3/2021 | Loehr | H04W 76/28 |
| 2022/0116875 A1* | 4/2022 | Nimbalker | H04W 52/0216 |

OTHER PUBLICATIONS

Qualcomm Incorporated: "Triggering Adaptation of UE Power Consumption Characteristics", 3GPP Draft,3GPP TSG-RAN WG1 Meeting #94bis, R1-1811283, Triggering Mechanism for Adaptation, 3rd Generation Partnership Project (3GPP), Mobile Competence Centre, 650, Route Des Lucioles, F-06921, Sophia-Antipolis Cedex, France, vol. Ran WG1, No. Chengdu, China, Oct. 8, 2018-Oct. 12, 2018, Sep. 29, 2018 (Sep. 29, 2018), XP051518686, 12 Pages.

VIVO: "Remaining Aspects of PDCCH-based Power Saving Signal", 3GPP TSG RAN WG1 #98bis, 3GPP Draft, R1-1910233, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, 14 Pages, Oct. 4, 2019 (Oct. 4, 2019), XP051808136.

CATT: "Power Saving Signal/Channel Design and Performance", 3GPP TSG RAN WG1 Meeting #98Bis, R1-1910353, Chongqing, China, Oct. 14, 2019-Oct. 20, 2019, pp. 1-18, Oct. 20, 2019.

* cited by examiner

WAKE-UP BEAM MANAGEMENT

CROSS-REFERENCE TO RELATED APPLICATION(S)

This application claims benefit of and priority to U.S. Provisional Application No. 62/987,734, filed Mar. 10, 2020, which is hereby assigned to the assignee hereof and hereby expressly incorporated by reference herein in its entirety as if fully set forth below and for all applicable purposes.

BACKGROUND

Field of the Disclosure

Certain aspects of the present disclosure provide techniques for determining resources and beams to use when monitoring for wake up signals (WUSs).

Description of the Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, or other resources). Multiple-access technologies can rely on any of code division, time division, frequency division, orthogonal frequency division, single-carrier frequency division, or time division synchronous code division multiple access (TD-SCDMA) systems, to name a few. These and other multiple access technologies have been adopted in various telecommunication standards to provide a common protocol that enables different wireless devices to communicate on a municipal, national, regional, and even global level.

As the demand for mobile broadband access continues to increase, there exists a need for further improvements in NR and LTE technology. These improvements should be applicable to other multi-access technologies and the telecommunication standards that employ these technologies.

SUMMARY

Certain aspects can be implemented in a method for wireless communications by a user equipment (UE). The method generally includes measuring one or more synchronization signal blocks (SSBs) transmitted from a network entity, determining one or more wake up signal (WUS) occasions and receive (RX) beams to monitor based on the SSB measurements, and deciding to wake up for an ON duration when a WUS is detected in one of the WUS occasions.

Certain aspects can be implemented in an apparatus for wireless communication by a UE. The apparatus may include a processing system, comprising: a memory comprising computer-executable instructions and one or more processors configured to execute the computer-executable instructions and cause the processing system to measure one or more SSBs transmitted from a network entity, determining one or more WUS occasions and RX beams to monitor based on the SSB measurements, and deciding to wake up for an ON duration when a WUS is detected in one of the WUS occasions.

Certain aspects can be implemented in an apparatus for wireless communication by a UE. The apparatus may include means for measuring one or more SSBs transmitted from a network entity, means for determining one or more WUS occasions and RX beams to monitor based on the SSB measurements, and means for deciding to wake up for an ON duration when a WUS is detected in one of the WUS occasions.

Certain aspects can be implemented in a non-transitory computer-readable medium for wireless communication by a UE. The non-transitory computer-readable medium may comprise computer-executable instructions that, when executed by one or more processors of a processing system, cause the processing system to measure one or more SSBs transmitted from a network entity, determining one or more WUS occasions and RX beams to monitor based on the SSB measurements, and deciding to wake up for an ON duration when a WUS is detected in one of the WUS occasions.

Certain aspects can be implemented in a computer program product for wireless communication by a UE embodied on a computer-readable storage medium. The computer-readable storage medium may comprise code for measuring one or more SSBs transmitted from a network entity, code for determining one or more WUS occasions and RX beams to monitor based on the SSB measurements, and code for deciding to wake up for an ON duration when a WUS is detected in one of the WUS occasions.

Certain aspects can be implemented in a method for wireless communications by a network entity. The method generally includes transmitting SSBs to a UE, determining one or more WUS occasions and transmit (TX) beams for sending one or more WUSs based on an association with the SSBs, and transmitting one or more WUSs in one or more of the WUS occasions using the determined TX beams.

Certain aspects can be implemented in an apparatus for wireless communication by a network entity. The apparatus may include a processing system, comprising: a memory comprising computer-executable instructions and one or more processors configured to execute the computer-executable instructions and cause the processing system to transmit SSBs to a UE, determine one or more WUS occasions and TX beams for sending one or more WUSs based on an association with the SSBs, and transmit one or more WUSs in one or more of the WUS occasions using the determined TX beams.

Certain aspects can be implemented in an apparatus for wireless communication by a network entity. The apparatus may include means for transmitting SSBs to a UE, means for determining one or more WUS occasions and TX beams for sending one or more WUSs based on an association with the SSBs, and means for transmitting one or more WUSs in one or more of the WUS occasions using the determined TX beams.

Certain aspects can be implemented in a non-transitory computer-readable medium for wireless communication by a network entity. The non-transitory computer-readable medium may comprise computer-executable instructions that, when executed by one or more processors of a processing system, cause the processing system to transmit SSBs to a UE, determine one or more WUS occasions and TX beams for sending one or more WUSs based on an association with the SSBs, and transmit one or more WUSs in one or more of the WUS occasions using the determined TX beams.

Certain aspects can be implemented in a computer program product for wireless communication by a network entity embodied on a computer-readable storage medium.

The computer-readable storage medium may comprise code for transmitting SSBs to a UE, code for determining one or more WUS occasions and TX beams for sending one or more WUSs based on an association with the SSBs, and code for transmitting one or more WUSs in one or more of the WUS occasions using the determined TX beams.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE FIGURES

The appended figures depict certain features of the various aspects described herein and are not to be considered limiting of the scope of this disclosure.

DETAILED DESCRIPTION

Aspects of the present disclosure provide systems and methods for determining resources and beams to use when monitoring for wake up signals (WUSs). More specifically, aspects of the present disclosure provide techniques that may help a reduced-capability UE determine one or more WUS occasions and receive beams to use when monitoring for WUSs, for example, based on an association between synchronization signal blocks (SSBs) and beams used to transmit the one or more WUS transmissions.

Introduction to Wireless Communication Networks

Figure 1:
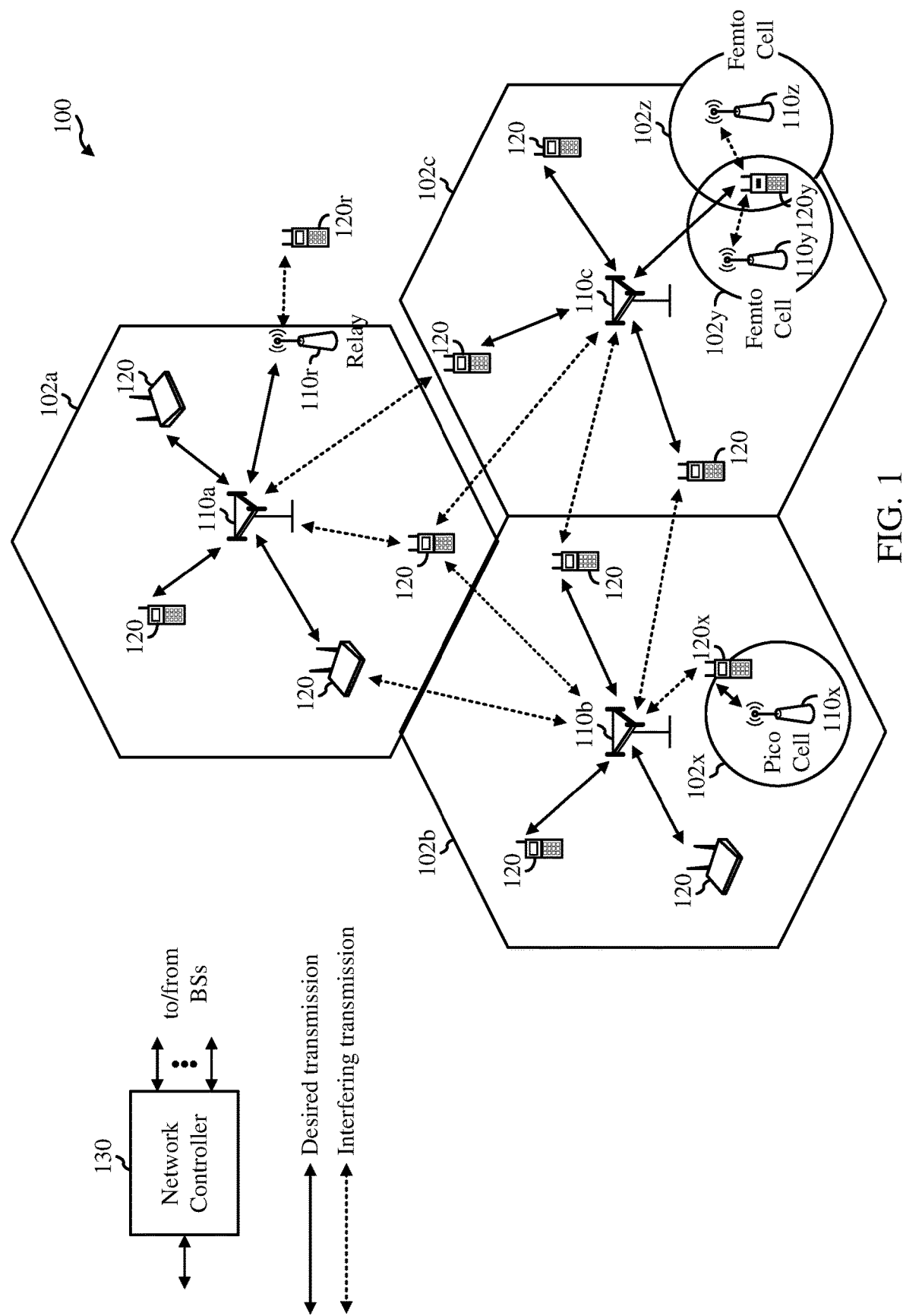
FIG. 1 is a block diagram conceptually illustrating an example wireless communication network, in accordance with certain aspects of the present disclosure.

FIG. 1 illustrates an example of a wireless communication network 100 (e.g., an NR/5G network), in which aspects described herein may be implemented.

Figure 13:
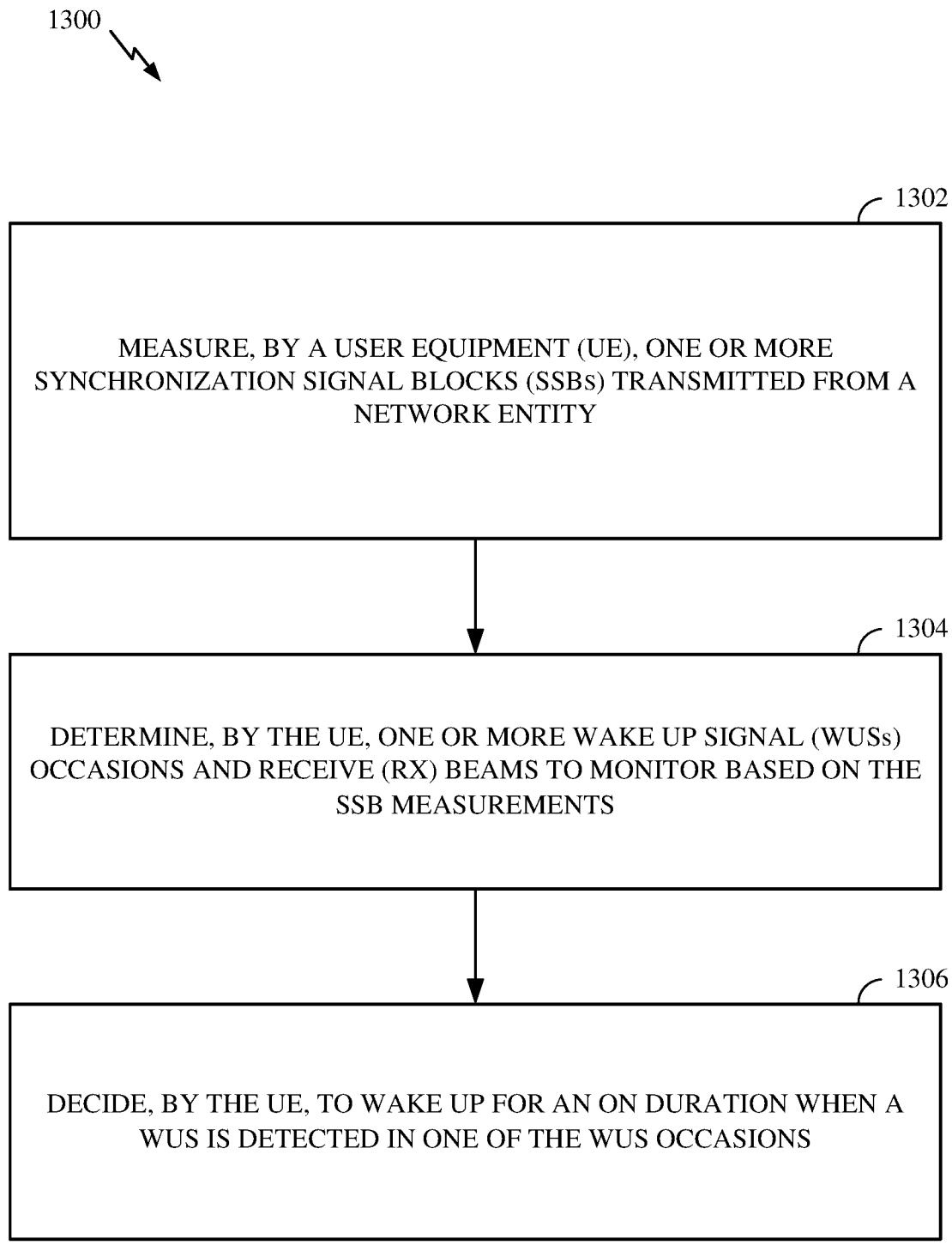
FIG. 13 illustrates example operations for wireless communications by a UE, in accordance with certain aspects of the present disclosure.
Figure 14:
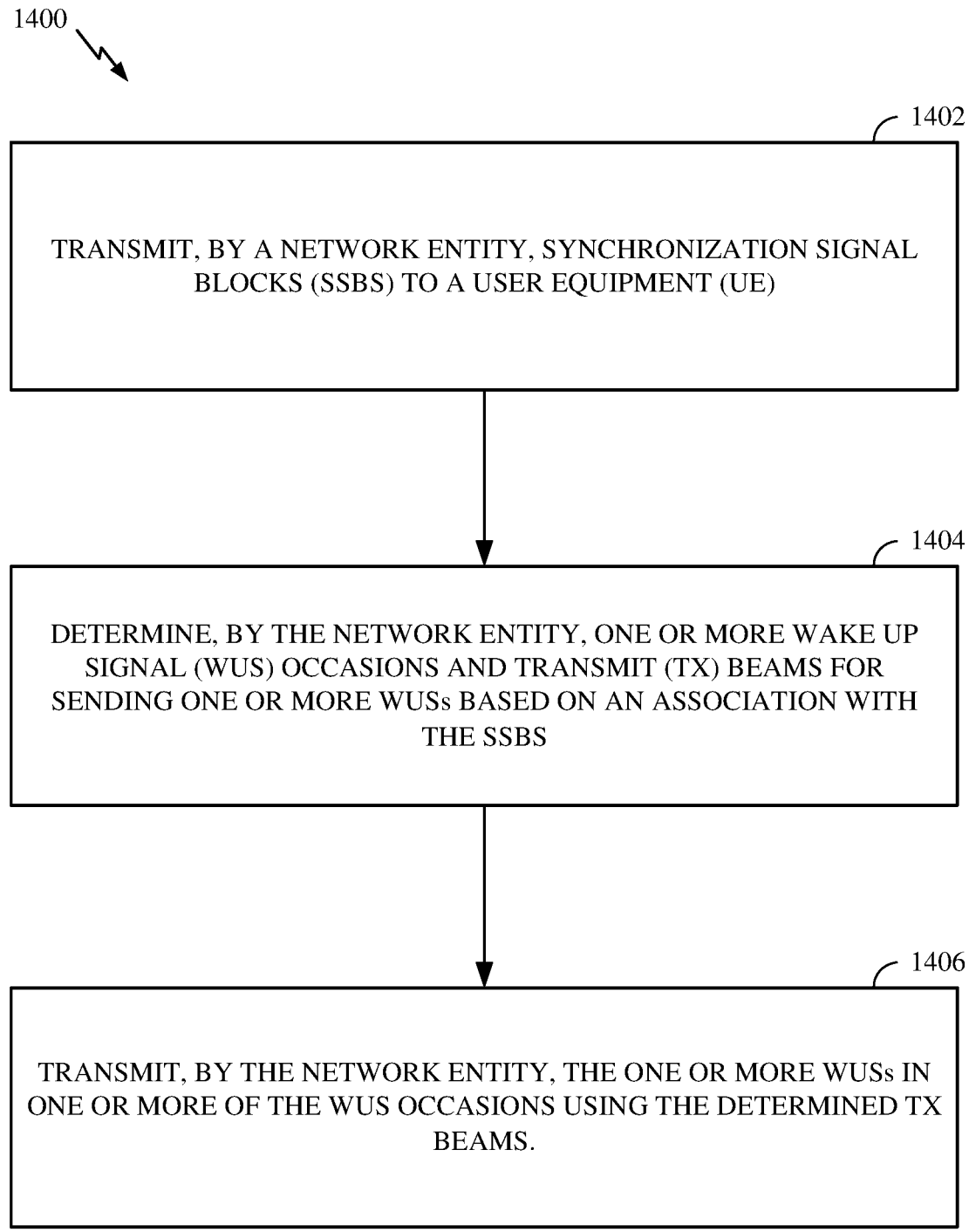
FIG. 14 illustrates example operations for wireless communications by a network entity, in accordance with certain aspects of the present disclosure.

For example, a base station (BS) 110b performing operations 1400 of FIG. 14 may send one or more WUSs to a user equipment (UE) 120. The UE 120 may perform operations 1300 of FIG. 13 to determine resources and beams to use in monitoring for the one or more WUSs.

As illustrated in FIG. 1, the wireless network 100 may include a number of BSs 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio (NR) BS, 5G NB, access point (AP), or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHZ (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the UL and DL and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the DL and/or UL. A finely dashed line with double arrows indicates interfering transmissions between a UE and a BS.

Figure 2:
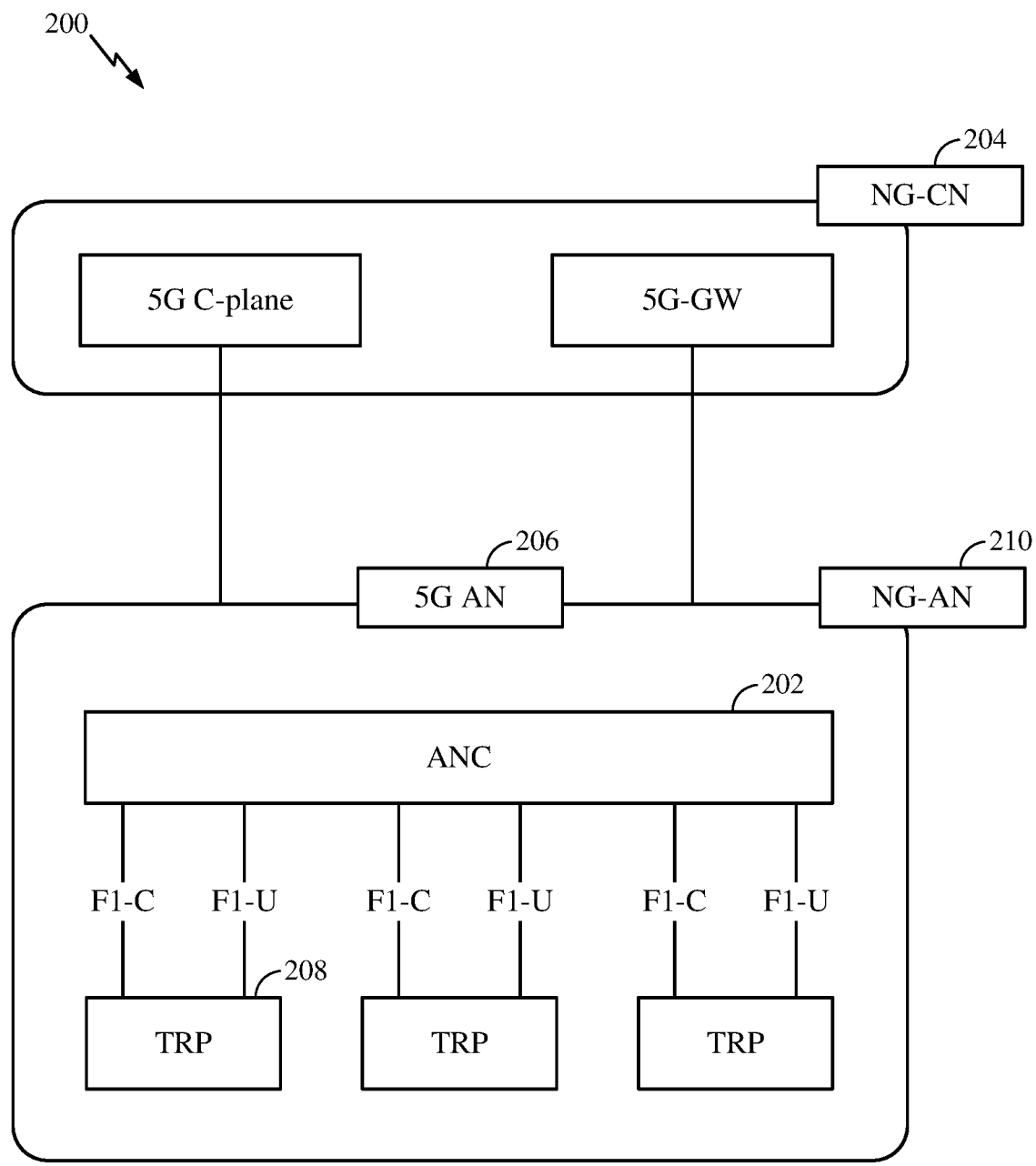
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
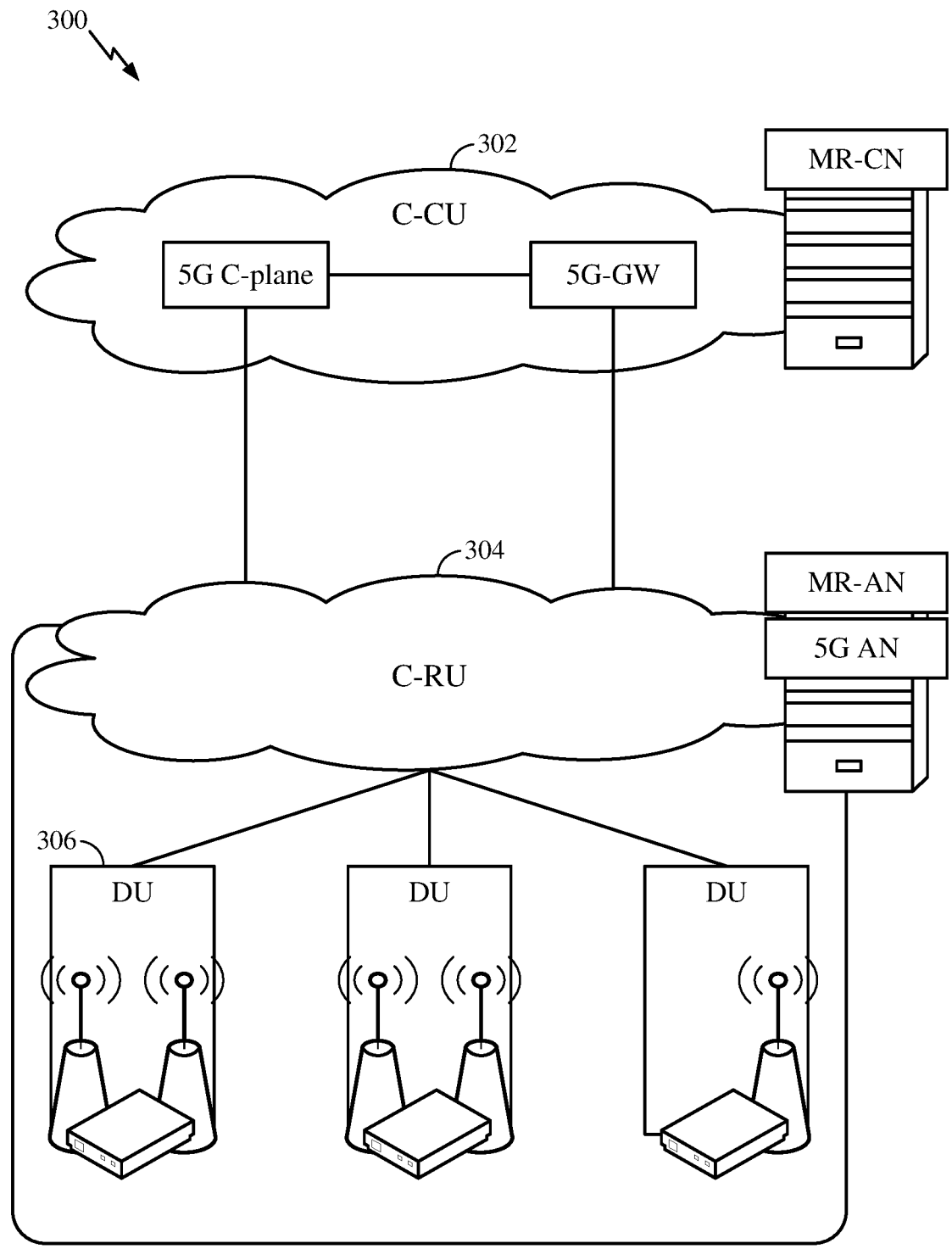
FIG. 3 is a diagram illustrating an example physical architecture of a distributed RAN, in accordance with certain aspects of the present disclosure.

FIG. 3 illustrates an example physical architecture of a distributed RAN 300, in accordance with certain aspects of the present disclosure. A centralized core network unit (C-CU) 302 may host core network functions. C-CU 302 may be centrally deployed. C-CU 302 functionality may be offloaded (e.g., to advanced wireless services (AWS)) in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
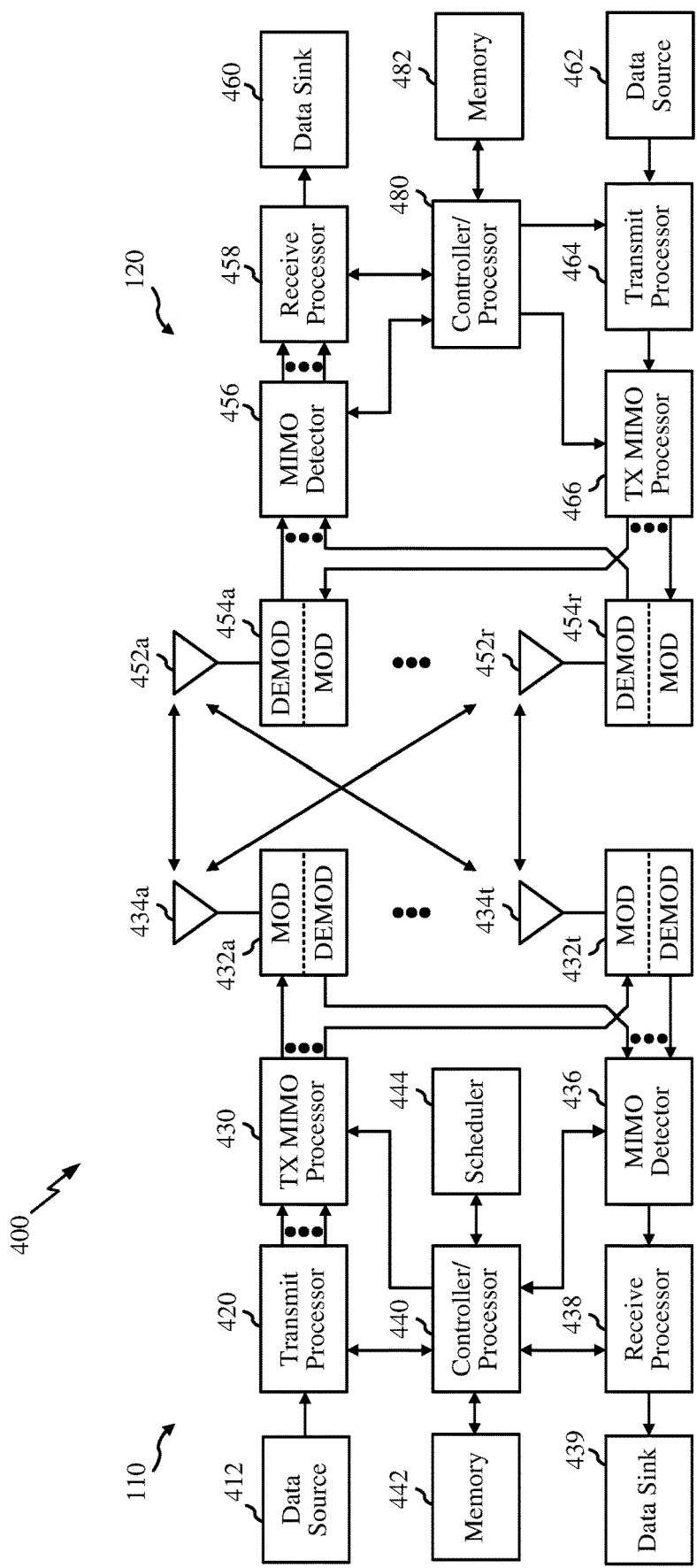
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a DL signal. DL signals from modulators 432a through 432t may be transmitted via the antennas 434a through 434t, respectively.

At the UE 120, the antennas 452a through 452r may receive the downlink signals from the BS 110 and may provide received signals to the demodulators (DEMODs) in transceivers 454a through 454r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators in transceivers 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the UL, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the BS 110. At the BS 110, the UL signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein (e.g., to perform operations 1400 of FIG. 14), while the processor 480 and/or other processors and modules at the BS 110 may perform or direct the execution of processes for the techniques described herein (e.g., to perform operations 1300 of FIG. 13). The memories 442 and 482 may store data and program codes for BS 110 and UE 120, respectively. A scheduler 444 may schedule UEs for data transmission on the downlink and/or uplink.

Figure 5:
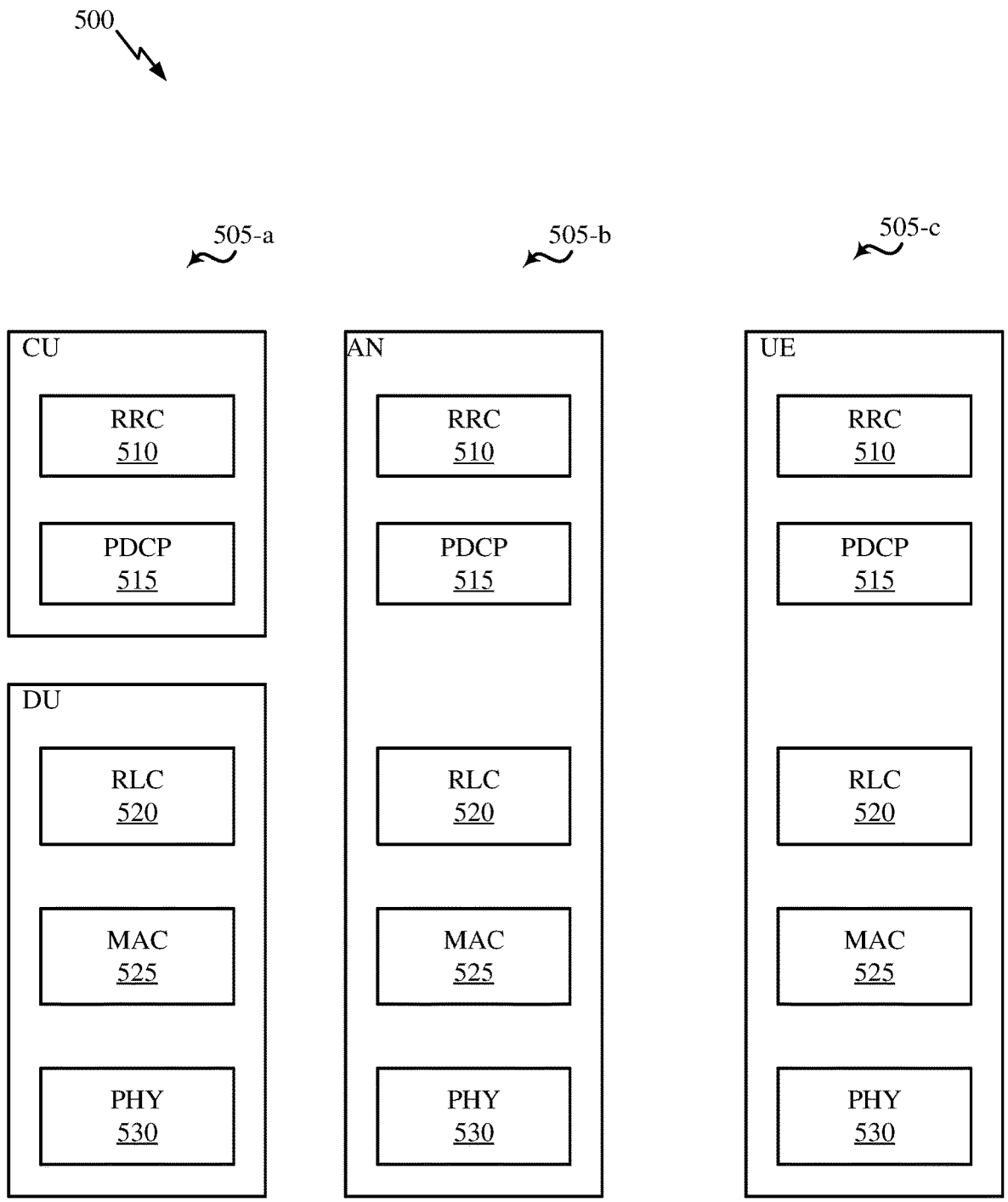
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530.

In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

Embodiments discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR resource block (RB) is 12 consecutive frequency subcarriers. NR may support a base subcarrier spacing (SCS) of 15 KHz and other SCS may be defined with respect to the base SCS, for example, 30 kHz, 60 kHz, 120 kHz, 240 kHz, etc. The symbol and slot lengths scale with the SCS. The CP length also depends on the subcarrier spacing.

Figure 6:
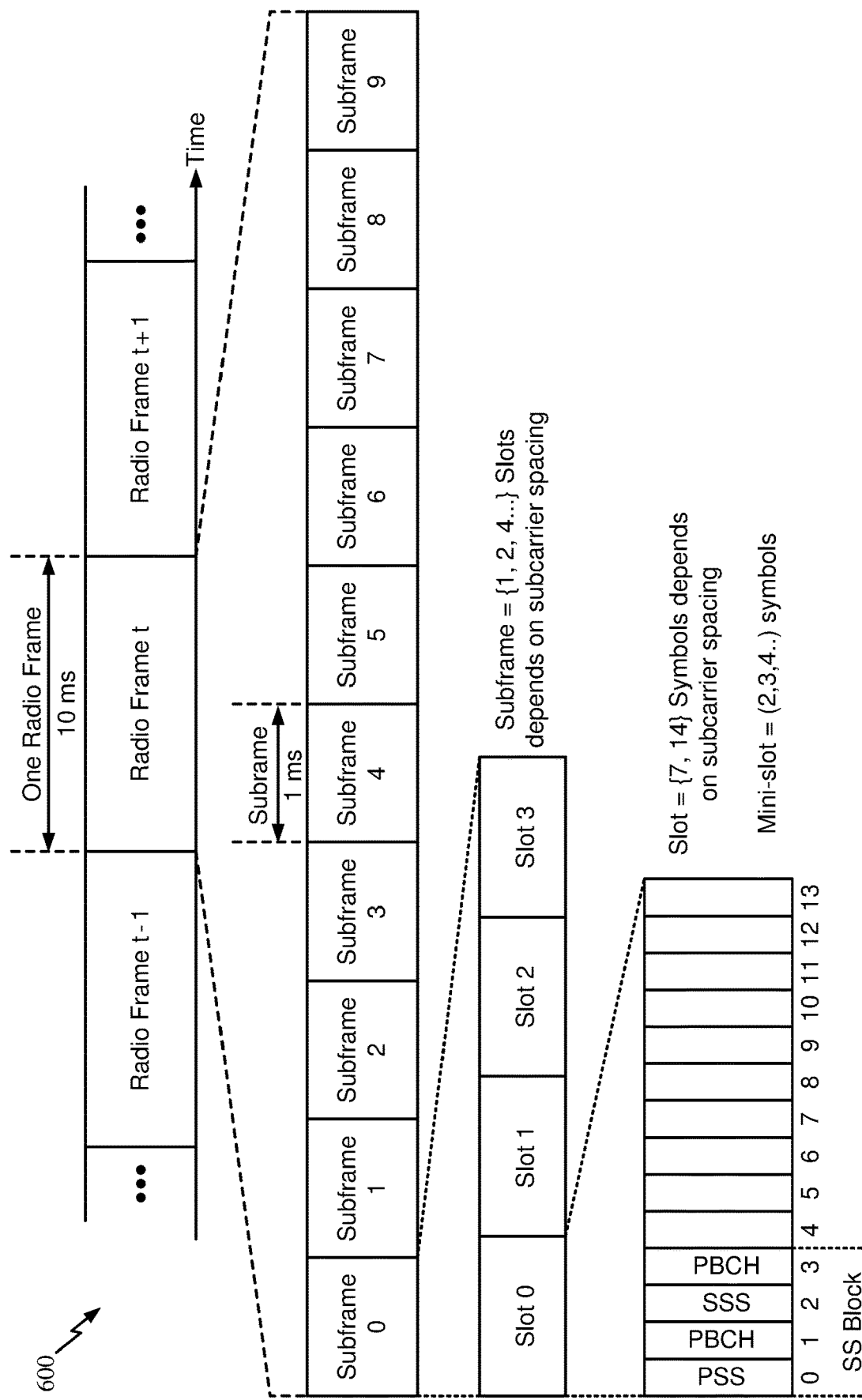
FIG. 6 illustrates an example of a frame format for a new radio (NR) system, in accordance with certain aspects of the present disclosure.

FIG. 6 is a diagram showing an example of a frame format 600 for NR, in accordance with certain aspects of the present disclosure. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. The SSB includes a PSS, a SSS, and a two symbol PBCH. The SSB can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB may be transmitted up to sixty-four times, for example, with up to sixty-four different beam directions for mmW. The multiple transmissions of the SSB are referred to as the SS burst set. SSBs in an SS burst set may be transmitted in the same frequency region, while SSBs in different SS bursts sets can be transmitted at different frequency regions.

Figure 7:
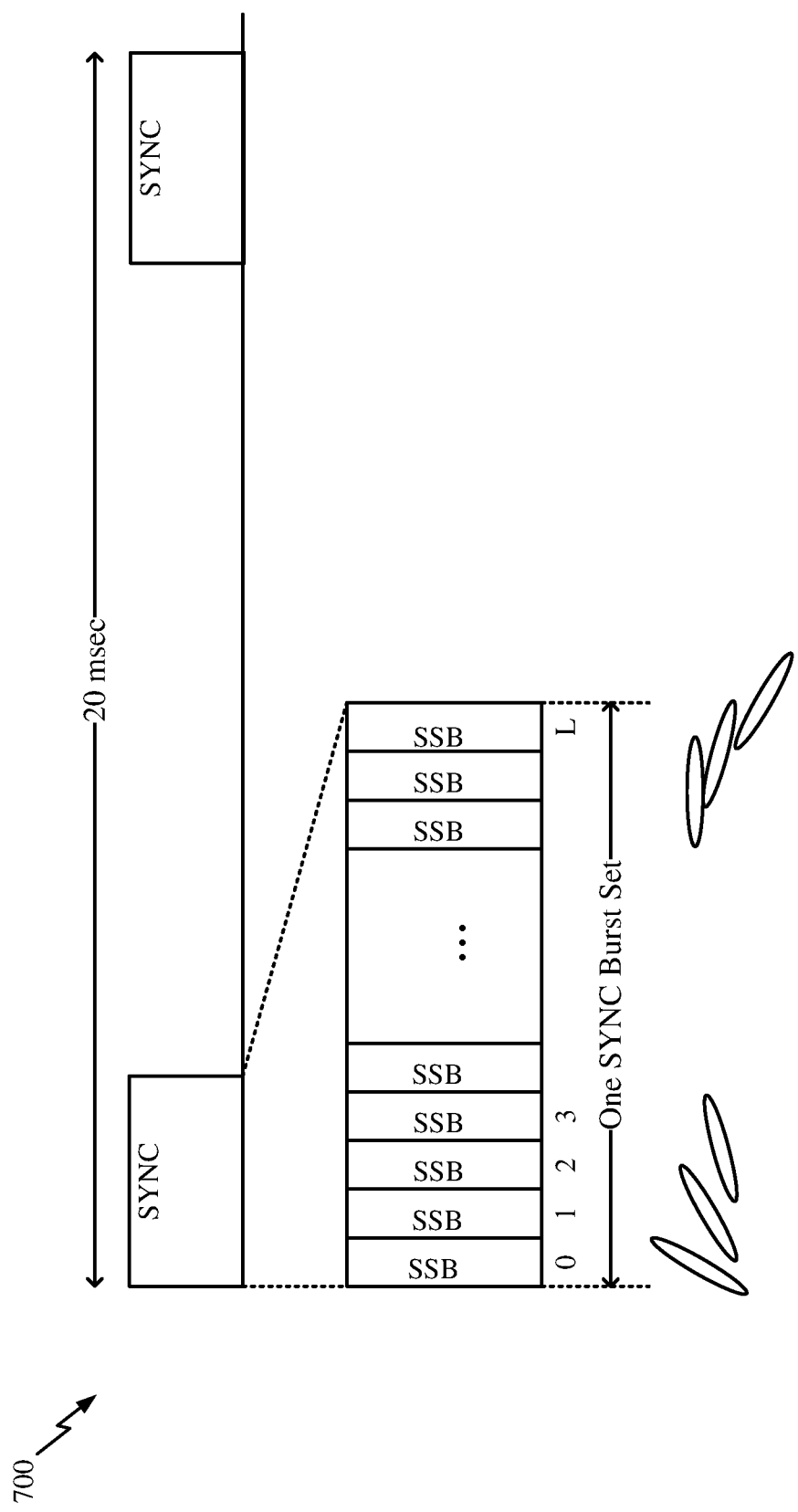
FIG. 7 illustrates how different synchronization signal blocks (SSBs) may be sent using different beams, in accordance with certain aspects of the present disclosure.

As shown in FIG. 7, the SSBs may be organized into SS burst sets to support beam sweeping. As shown, each SSB within a burst set may be transmitted using a different beam, which may help a UE quickly acquire both transmit (TX) and receive (RX) beams (particular for mmW applications). A physical cell identity (PCI) may be decoded from the PSS and SSS of the SSB.

Certain deployment scenarios may include one or both NR deployment options. Some may be configured for a non-standalone (NSA) and/or a standalone (SA) option. A standalone cell may need to broadcast both SSB and RMSI, for example, with two SIBs (e.g., SIB1 and SIB2). A non-standalone cell may only need to broadcast SSB, without broadcasting RMSI. In a single carrier in NR, multiple SSBs may be sent in different frequencies, and may include the different types of SSBs.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Quasi Co-Location (QCL) Port and Transmission Configuration Indicator (TCI) States In many cases, it may be important for a user equipment (UE) to know which assumptions it may make on a channel corresponding to different transmissions. For example, the UE may need to know which reference signals it may use to estimate the channel in order to decode a transmitted signal (e.g., physical downlink control channel (PDCCH) or physical downlink shared channel (PDSCH)). It may also be important for the UE to be able to report relevant channel state information (CSI) to a base station (BS) (or gNB) for scheduling, link adaptation, and/or beam management purposes. In New Radio (NR), the concept of quasi co-location (QCL) and transmission configuration indicator (TCI) states may be used to convey information about these assumptions.

QCL assumptions may be defined in terms of channel properties. Per 3rd Generation Partnership Project (3GPP) Technical Specification (TS) 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal (RS) to help detect a second RS. TCI states generally include configurations such as QCL-relationships, for example, between the downlink (DL) RSs in one CSI-RS set and the PDSCH demodulation reference signal (DMRS) ports.

In some cases, a UE may be configured with up to M TCI-States. Configuration of the M TCI-States may come about via higher layer signalling, while a UE may be signalled to decode PDSCH according to a detected PDCCH with downlink control information (DCI) indicating one of the TCI states. Each configured TCI state may include one RS set TCI-RS-SetConfig that indicates different QCL assumptions between certain source and target signals.

Figure 8:
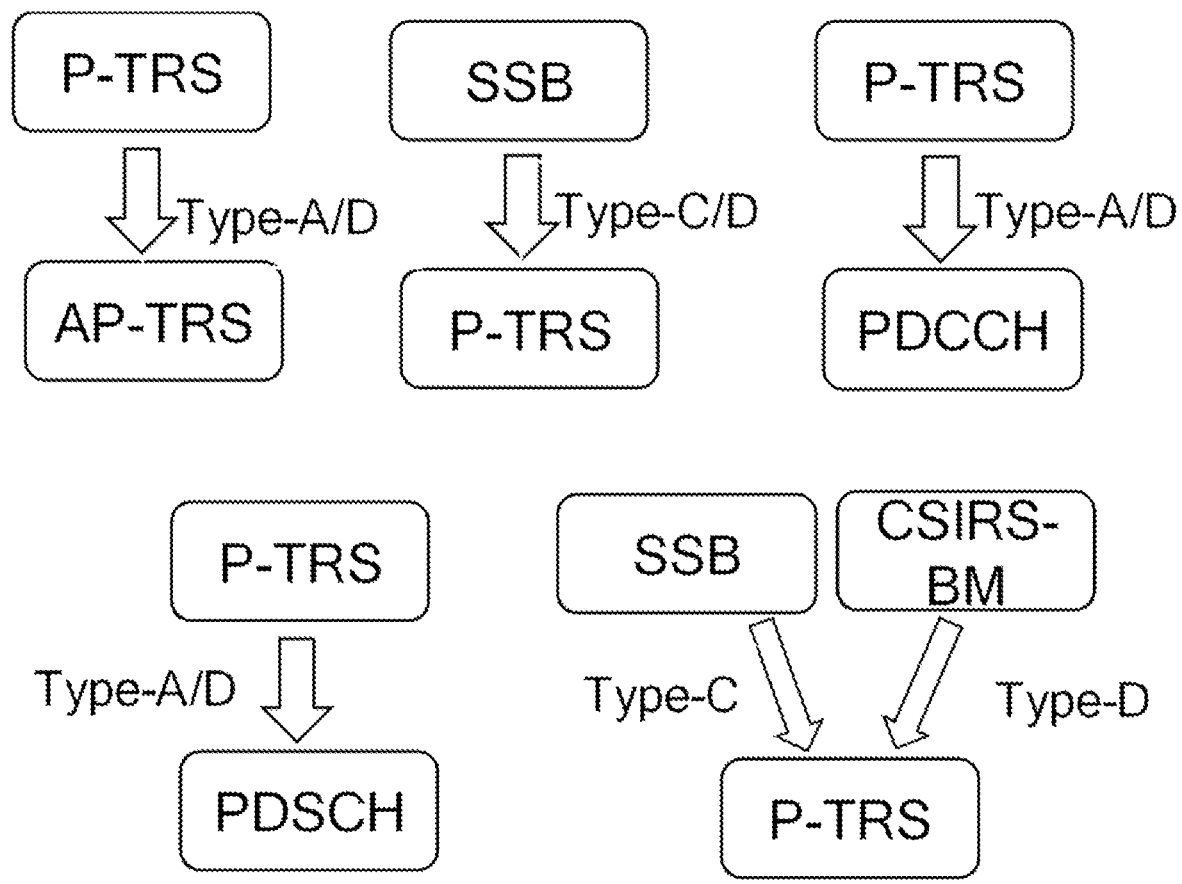
FIG. 8 illustrates example quasi co-location (QCL) relationships, in accordance with certain aspects of the present disclosure.

FIG. 8 illustrates example QCL relationships, in accordance with certain aspects of the present disclosure. More specifically, FIG. 8 illustrates examples of the association of DL RSs with corresponding QCL types that may be indicated by a TCI-RS-SetConfig.

In the examples of FIG. 8, a source RS may be indicated in the top block and may be associated with a target signal indicated in the bottom block. In this context, a target signal may refer to a signal for which channel properties may be inferred by measuring those channel properties for an associated source signal. As noted above, a UE may use the source RS to determine various channel parameters, depending on the associated QCL type. Further, the UE may use those various channel parameters (determined based on the source RS) to process the target signal. A target RS may not necessarily need to be a PDSCH's DMRS, rather it may be any other RS: physical uplink shared channel (PUSCH) DMRS, CSI-RS, tracking reference signal (TRS), and sounding reference signal (SRS).

As illustrated, each TCI-RS-SetConfig may contain parameters. These parameters may, for example, configure QCL relationship(s) between RSs in the RS set and the DMRS port group of the PDSCH. The RS set may contain a reference to either one or two DL RSs and an associated QCL-Type for each one configured by the higher layer parameter QCL-Type.

As illustrated in FIG. 8, for the case of two DL RSs, the QCL types may take on a variety of arrangements. For example, QCL types may not be the same, regardless of whether the references are to the same DL RSs or different DL RSs. In the illustrated example, a SSB may be associated with Type C QCL for phase tracking reference signal (P-TRS), while CSI-RS for beam management (CSIRS-BM) may be associated with Type D QCL.

QCL information and/or types may, in some scenarios, depend on or be a function of other information. For example, the QCL types indicated to the UE may be based on higher layer parameter QCL-Type and may take one or a combination of the following types:

QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial RX parameter}, Spatial QCL assumptions (QCL-TypeD) may be used to help a UE select an analog receive (RX) beam (e.g., during beam management procedures). For example, an SSB resource indicator may indicate a same beam for a previous RS should be used for a subsequent transmission.

An initial CORESET (e.g., CORESET ID 0 or simply CORESET #0) in NR may be identified during initial access by a UE (e.g., via a field in the MIB). A ControlResourceSet information element (CORESET IE), sent via radio resource control (RRC) signaling, may convey information regarding a CORESET configured for a UE. The CORESET IE may include a CORESET ID, an indication of frequency domain resources (e.g., number of RBs) assigned to the CORESET, contiguous time duration of the CORESET in a number of symbols, and TCI states.

As noted above, a subset of the TCI states may provide QCL relationships between DL RS(s) in one RS set (e.g., TCI-Set) and PDCCH DMRS ports. A particular TCI state for a given UE (e.g., for unicast PDCCH) may be conveyed to the UE via a Medium Access Control (MAC) Control Element (MAC-CE). The particular TCI state may be selected from the set of TCI states conveyed by the CORESET IE, with the initial CORESET (CORESET #0) generally configured via the MIB.

Search space information may also be provided via RRC signaling. For example, the Search Space IE may be another RRC IE that defines how and where to search for PDCCH candidates for a given CORESET. Each search space may be associated with one CORESET. The Search Space IE may identify a search space configured for a CORESET by a search space ID. In an aspect, the search space ID associated with CORESET #0 may be Search Space ID #0. The search space may be configured via PBCH (MIB).

Example Beam Management Procedures

Figure 9:
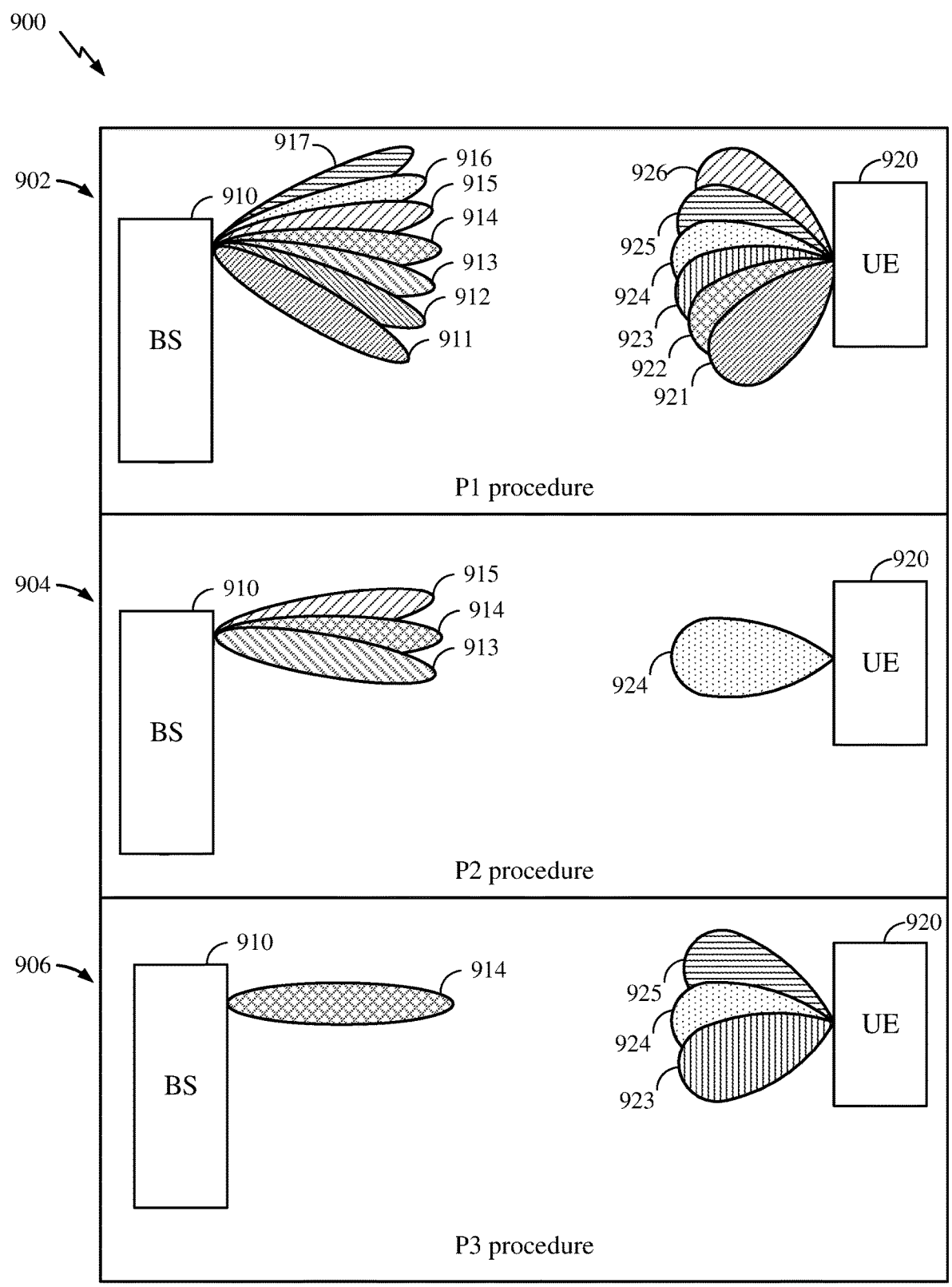
FIG. 9 illustrates example beam management procedures, in accordance with certain aspects of the present disclosure.

FIG. 9 illustrates example beam management procedures, in accordance with certain aspects of the present disclosure. As shown in FIG. 9, beam management procedures may be divided into three phases: P1 procedure, P2 procedure, and P3 procedure. In 5G New Radio (NR), the beam management procedure for determining beam pair links (BPLs) may be referred to as a P1 procedure. A base station (BS) 910 (e.g., such as the BS 110a in FIG. 1 and/or FIG. 4) may send a measurement request to a user equipment (UE) 920 (e.g., such as the UE 120a in FIG. 1 and/or FIG. 4) and may subsequently transmit one or more signals (sometimes referred to as the "P1-signal") to the UE 920 for measurement. In the P1 procedure 902, the BS 910 may transmit the signal with beam forming in a different spatial direction (corresponding to a transmit beam 911, 912, ..., 917) in each symbol, such that several (e.g., most or all) relevant spatial locations of the cell of the BS 910 are reached. In this manner, the BS 910 may transmit the signal using different transmit beams over time in different directions. In some examples, a synchronization signal block (SSB) may be used as the P1-signal. In some examples, a channel state information reference signal (CSI-RS), a demodulation reference signal (DMRS), or another downlink (DL) signal may be used as the P1-signal.

In the P1 procedure 902, to successfully receive at least a symbol of the P1-signal, the UE 920 may find (e.g., determine/select) an appropriate receive beam (921, 922, ..., 926). Signals (e.g., SSBs) from multiple BSs may be measured simultaneously for a given signal index (e.g., SSB index) corresponding to a given time period. The UE 920 may apply a different receive beam during each occurrence (e.g., each symbol) of the P1-signal. Once the UE 920 succeeds in receiving a symbol of the P1-signal, the UE 920 and BS 910 may have discovered a BPL (i.e., the UE receive (RX) beam used to receive the P1-signal in the symbol and the BS transmit (TX) beam used to transmit the P1-signal in the symbol). In some cases, the UE 920 may not search all of its possible UE RX beams until it finds the best UE RX beam, since this causes additional delay. Instead, the UE 920 may select a RX beam once the RX beam is "good enough", for example, having a quality (e.g., signal to noise ratio (SNR) or signal to interference and noise ratio (SINR)) that satisfies a threshold (e.g., predefined threshold). The UE 920 may not know which beam the BS 910 used to transmit the P1-signal in a symbol; however, the UE 920 may report to the BS 910 the time at which it observed the signal. For example, the UE 920 may report the symbol index in which the P1-signal was successfully received to the BS 910. The BS 910 may receive this report and determine which BS TX beam the BS 910 used at the indicated time. In some examples, UE 920 may measure signal quality of the P1-signal, such as reference signal receive power (RSRP) or another signal quality parameter (e.g., SNR, channel flatness, etc.). The UE 920 may report the measured signal quality (e.g., RSRP) to the BS 910 together with the symbol index. In some cases, the UE 920 may report multiple symbol indices to the BS 910, corresponding to multiple BS TX beams.

As a part of a beam management procedure, the BPL used between a UE 920 and BS 910 may be refined/changed. For example, the BPL may be refined periodically to adapt to changing channel conditions, for example, due to movement of the UE 920 or other objects, fading due to Doppler spread, etc. The UE 920 may monitor the quality of a BPL (e.g., a BPL found/selected during the P1 procedure and/or a previously refined BPL) to refine the BPL when the quality drops (e.g., when the BPL quality drops below a threshold or when another BPL has a higher quality). In 5G NR, the beam management procedures for beam refinement of BPLs may be referred to as the P2 and P3 procedures to refine the BS-beam and UE-beam, respectively, of an individual BPL.

As shown in FIG. 9, for the P2 procedure 904, the BS 910 may transmit symbols of a signal with different BS-beams (e.g., TX beams 915, 914, 913) that may be spatially close to the BS-beam of the current BPL. For example, the BS 910 may transmit the signal in different symbols using neighboring TX beams (e.g., beam sweeps) around the TX beam of the current BPL. As shown in FIG. 9, the TX beams used by the BS 910 for the P2 procedure 904 may be different from the TX beams used by the BS 910 for the P1 procedure 902. For example, the TX beams used by the BS 910 for the P2 procedure 904 may be spaced closer together and/or may be more focused (e.g., narrower) than the TX beams used by the BS 910 for the P1 procedure. During the P2 procedure 904, the UE 920 may keep its RX beam (e.g., RX beam 924) constant. The UE 920 may measure the signal quality (e.g., RSRP) of the signal in the different symbols and indicate the symbol in which the highest signal quality was measured. Based on the indication, the BS 910 may determine the strongest (e.g., best, or associated with the highest signal quality) TX beam (i.e., the TX beam used in the indicated symbol). The BPL may be refined accordingly to use the indicated TX beam.

As shown in FIG. 9, for the P3 procedure 906, the BS 920 may maintain a constant TX beam (e.g., the TX beam of the current BPL) and transmit symbols of a signal using the constant TX beam (e.g., TX beam 914). During the P3 procedure 906, the UE 920 may scan the signal using different RX beams (e.g., RX beams 923, 924, 925) in different symbols. For example, the UE 920 may perform a sweep using neighboring RX beams to the RX beam in the current BPL (i.e., the BPL being refined). The UE 920 may measure the signal quality (e.g., RSRP) of the signal for each RX beam and identify the strongest UE RX beam. The UE 920 may use the identified RX beam for the BPL. The UE 920 may report the signal quality to the BS 910.

Example Connected Mode Discontinuous Reception (C-DRX) with Beamforming and Wake Up Signals (WUSs)

Power saving techniques, such as a discontinuous reception (DRX) mode, may allow a wireless node, such as a user equipment (UE), to enter a low power mode for durations in which the wireless node does not transmit and/or receive and to exit the low power mode for durations in which the wireless node monitors for transmissions and/or sends transmissions. More specifically, a power savings configuration may allow the wireless node to power off one or more radio frequency (RF) components, including baseband processing components, RF RX front end components (e.g., referred to as a receive (RX) chain) and RF TX front end components (e.g., referred to as a transmit (TX) chain), when not in use in order to save power.

To enable reasonable UE battery consumption. DRX operation in Evolved UMTS Terrestrial Radio Access Network (E-UTRAN) is defined. A UE may be configured with a DRX functionality that controls the UE's physical downlink control channel (PDCCH) monitoring activity. Two types of DRX processes may be used in either radio resource control (RRC) Idle (RRC_Idle) or RRC_Connected states. When DRX is used in the connected state it is called Connected Mode DRX (C-DRX). C-DRX refers to a technique that allows a UE to discontinuously receive data in connected state (RRC_Connected state) where a radio connection is established between the UE and a network entity (e.g., BS). C-DRX provides a benefit of saving power consumption on devices; however, if data is not received in time, the resulting packet delay may cause packet loss, which may lead to service quality degradation.

Figure 10:
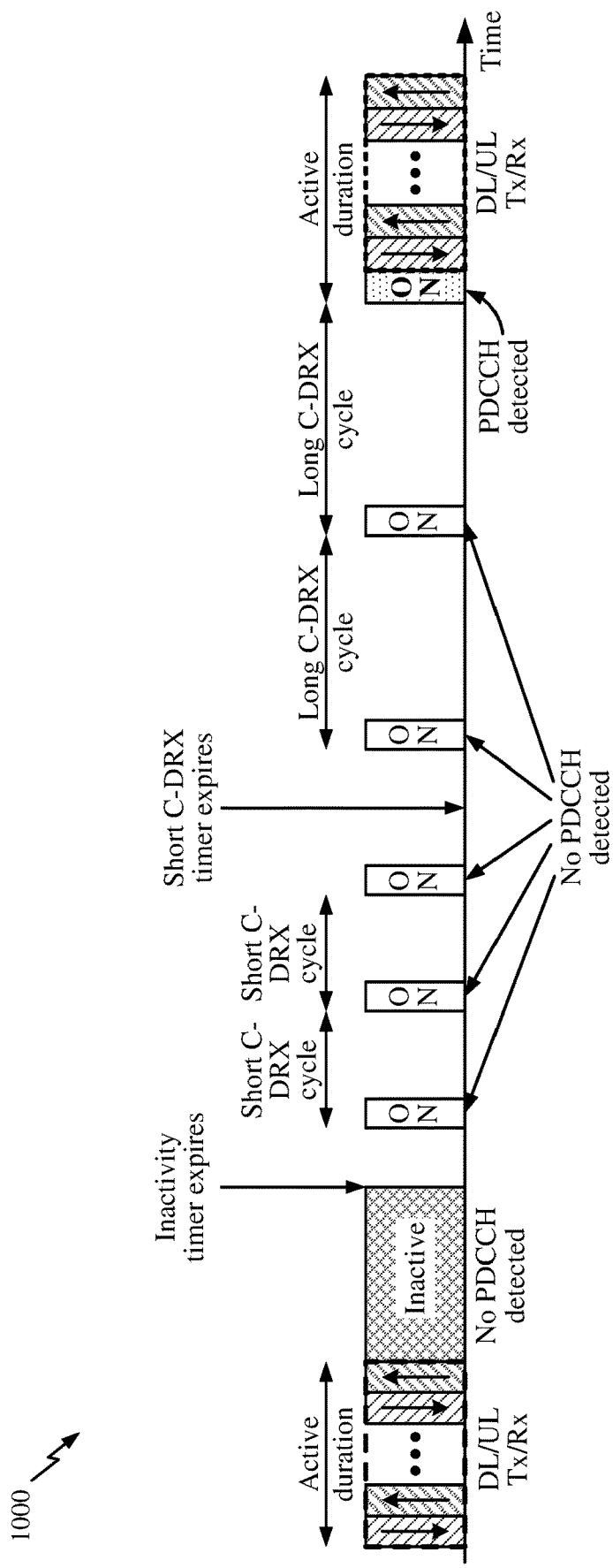
FIG. 10 illustrates connected mode discontinuous reception (C-DRX) operations, in which aspects of the present disclosure may be practiced.

FIG. 10 illustrates C-DRX operations, in which aspects of the present disclosure may be practiced. As illustrated in FIG. 10, during periods of traffic inactivity, a UE may switch to a C-DRX operation for power saving. A UE may be configured for C-DRX according to various configuration parameters, such as an inactivity timer, short DRX timer, short DRX cycle, and long DRX cycle.

As illustrated in FIG. 10, when a UE is configured with C-DRX, the UE may cycle through ON periods (e.g., ON durations) and OFF periods (e.g., OFF durations) based on configured cycles. When a UE is in a DRX ON duration, the UE may monitor for PDCCH transmissions. When the UE is in a DRX OFF duration, the UE may remain in a low power (sleep) state and stop monitoring transmissions (e.g., PDCCH on the access link) for the remainder of the C-DRX cycle. During the OFF duration, the UE may not be expected to transmit and/or receive any signal.

As shown in FIG. 10, when a PDCCH scheduling data is detected in an ON duration, the UE may wake up at the termination of a previous C-DRX cycle and start a DRX inactivity timer that indicates a duration the UE should remain ON and monitor for transmissions. If another transmission is received, the UE may restart the DRX inactivity timer. Once the timer expires, the UE may go back to sleep. If no PDCCH is detected in an ON duration, then the UE may go back to sleep at the end of the ON duration.

In some cases, to enhance the possibility of reaching the UE, beamforming may be used in conjunction with C-DRX. While beamforming may enhance communications, it may not do so without challenges. For example, without beam tracking, beam pairs may degrade during one or more C-DRX OFF durations. The longer the C-DRX cycle, the more vulnerable transmissions may be to beam degradation. While shorter C-DRX cycles may be less prone to beam degradation, shorter periods may suffer from a power consumption penalty.

Figure 11:
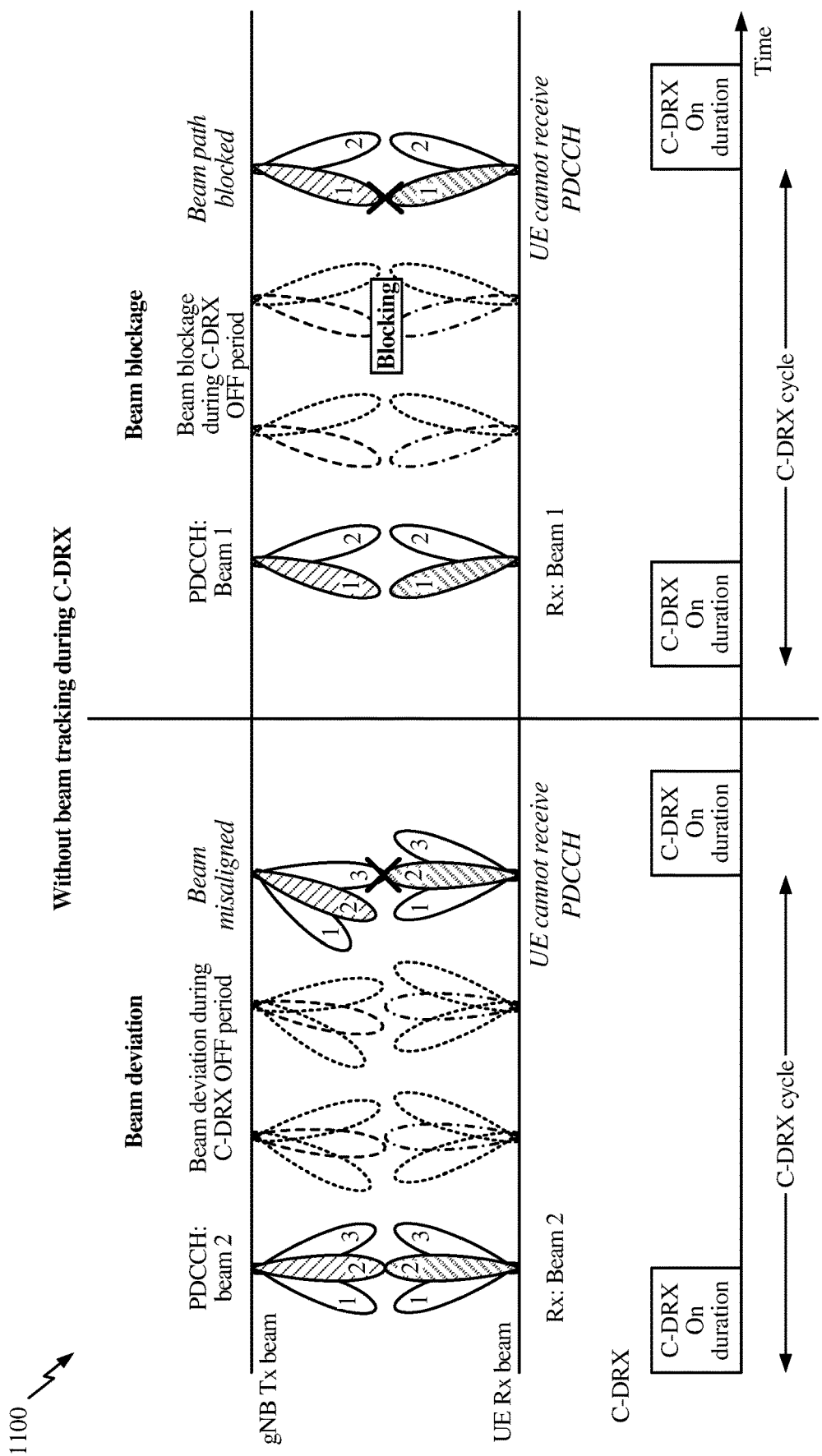
FIG. 11 illustrates C-DRX with beamforming, in which aspects of the present disclosure may be practiced.

FIG. 11 illustrates C-DRX with beamforming, in which aspects of the present disclosure may be practiced. As illustrated in FIG. 11, due to beam deviation caused by a change in the orientation of the UE or mobility of the UE during the C-DRX OFF duration, a UE may not be able to receive PDCCH at the beginning of the next C-DRX ON duration and fail to wake up. This may also be the case when there is beam blockage during the C-DRX OFF period, as shown in FIG. 11.

In some cases, DRX OFF durations (e.g., where the UE is operating in a low power (sleep) state) may be extended using wake up signals (WUSs). Techniques described herein may use a WUS to indicate to a UE whether an upcoming control channel signal resource includes information relevant to the UE. The WUS may be designed to allow for detection by a UE with relatively simple, low power, processing. In this way, the UE may more fully wake up to perform complex control channel signal processing only when the control channel includes signals relevant to the UE, thereby conserving battery power and resources of the UE. Jointly configuring a WUS configuration with a DRX configuration may add an extra layer of power saving before each DRX ON duration. The general principle of WUSs in C-DRX operations is illustrated in FIGS. 12A and 12B.

Figure 12A:
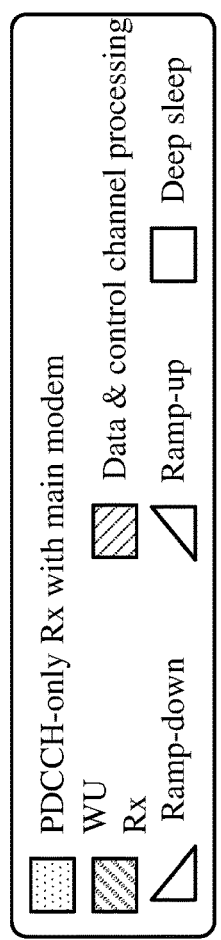
FIGS. 12A and 12B illustrate examples of C-DRX with wake-up signals (WUSs), in which aspects of the present disclosure may be practiced.
Figure 12A:
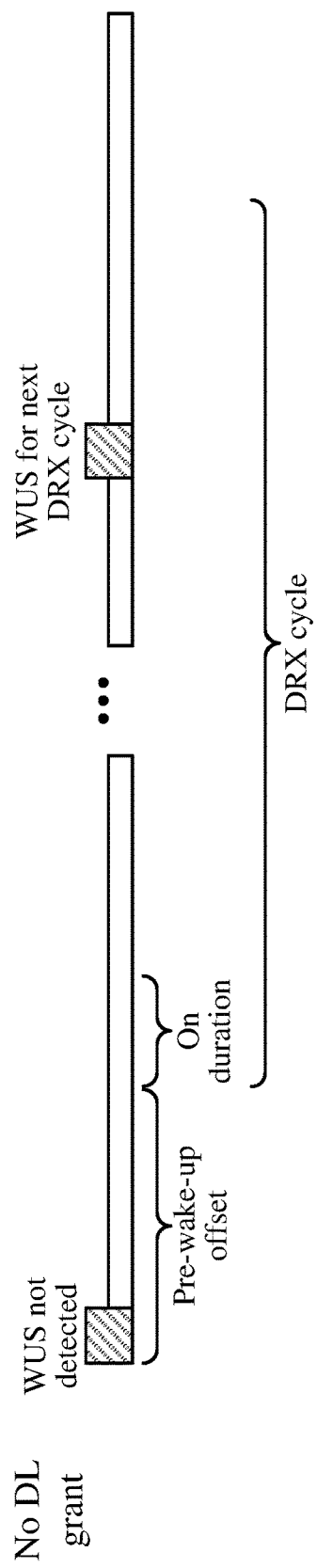
Figure 12B:
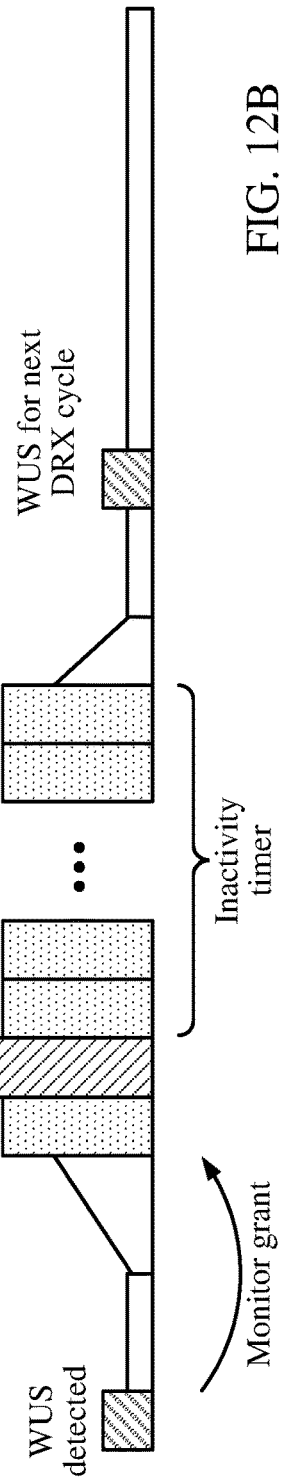

FIGS. 12A and 12B illustrate example C-DRX with WUS configurations 1200A and 1200B, in which aspects of the present disclosure may be practiced. As illustrated in FIGS. 12A and 12B, in the time period before a C-DRX ON duration, only a wake up subsystem may be turned on for WUS decoding (while the main modem is not powered on). The wake up subsystem may be a low complexity receiver (e.g., a simple correlator) using lower power than PDCCH decoding. The WUS may be a special waveform, such as special tone, preamble, reference signal (RS), or the like. Additionally, there may be different types of WUS, such as a RS-type WUS and a PDCCH-type WUS. RS-type WUSs may include RSs such as a channel state information reference signals (CSI-RS), a tracking reference signal (TRS), and a demodulation reference signal (DMRS). In some cases, PDCCH-type WUSs may use an existing downlink control information (DCI) format or a new compact DCI format.

A WUS occasion may occur (periodically) during the DRX OFF duration of the DRX configuration, and more specifically, a number of slots/symbols prior to the start of each DRX ON duration. As shown in FIG. 12A, if a WUS is not detected during the monitoring in the WUS occasion, the UE may not monitor for PDCCH transmissions in a DRX ON state and, instead, may remain in a low power state during the DRX ON duration of the DRX configuration (i.e., remain in a low power state until the next WUS occasion). Alternatively, as shown in FIG. 12B, if a WUS is detected during the monitoring in the WUS occasion, the UE may wake up the full modem for the next DRX ON duration.

WUSs may either be group-specific or UE-specific. For example, with group-specific WUSs, a group of UEs may share the same WUS and/or signaling occasions. This approach may allow for low network overhead, but at the expense of some UEs possibly being woken up even when there is no data. With UE-specific WUSs, on the other hand, each UE may have a dedicated WUS and/or WUS signaling occasions. While this approach may have a larger network overhead (when compared to group-specific WUSs), it may be more flexible and efficient in terms of UE power saving.

In some cases where C-DRX configurations are UE-specific, multiple UEs in the cell may share the same C-DRX configuration (e.g., C-DRX cycle and ON duration offset) in practice. Sharing the same C-DRX configuration may be beneficial from a network resource/power saving perspective.

For UEs sharing the same C-DRX configuration, WUSs may be either UE-specific or a scrambling sequence. For example, for UE-specific WUSs, each UE may be configured with a dedicated WUS (i.e. dedicated resource, sequence, format, scrambling, etc.). Additionally, for scrambling sequence WUSs, a group of UEs may share the same WUS. Scrambling the WUS may help prevent other UEs in the group from waking unnecessarily. The WUS may only be intended for one UE, and only the intended UE may be able to decode the WUS. Regardless of whether the WUS is UE-specific or a scrambling sequence, each UE may perform WUS detection within the assigned WUS resource.

Example Wake Up Beam Management for New Radio (NR) Light Devices

The techniques presented herein may be used in certain candidate traffic scenarios, for example, involving devices with reduced capability (e.g., New Radio (NR) light devices). Such devices may include devices used for industrial wireless sensors, video surveillance, and smart wearables. Traffic characteristics of such devices may often be uplink (UL) heavy (relative to downlink (DL)), sparse, and aperiodic. For example, a motion-detection-based surveillance camera may only transmit bursts of video occasionally and may stay idle a majority of the time. Additionally, the data may be transmitted in a relatively small payload burst.

Such a reduced-capability UE may stay in a CONNECTED mode to maintain UL transmission resources (e.g., physical uplink control channel (PUCCH)/physical uplink shared channel (PUSCH)/sounding reference signal (SRS) configurations) rather than frequently transitioning between CONNECTED and IDLE/INACTIVE modes, which may be more power consuming for reconfiguring and releasing the resources. In such cases, a data activity timer may be configured with a very large value to save power.

Although semi-persistent scheduling (SPS) may be used for DL transmissions, a UE may still need to monitor physical downlink control channel (PDCCH) transmissions for other aperiodic DL traffic or control (e.g., SPS activation/deactivation, paging short message, etc.). As noted above, in some cases, a UE may be configured with a very long DRX cycle to save power.

Further, due to stationary application (e.g., low or no device mobility) and small payload sizes (e.g., low data rates) in many reduced-capability UE scenarios, link measurement/link adaptation (LA) resource overhead may be minimized. For example, active closed-loop LA (e.g., by persistent/semi-persistent channel state information reference signal (P/SP-CSI-RS) or SRS) may not be needed. Rather, only synchronization signal blocks (SSBs), aperiodic CSI-RS (A-CSI-RS)/SRS, or outer-loop-based link/beam adaptation may be used. In such scenarios, a time alignment timer may also be set to a very large value (e.g., 10.24 seconds or infinity).

Aspects of the present disclosure provide techniques that may help reduced capability UEs (e.g., NR light devices) detect WUSs and perform SSB-based beam management for WUS monitoring. During DRX operations, a reduced capability UE may continue to measure one or more SSBs (e.g., outside an Active Time (e.g., an ON duration where a PDCCH is detected and the ON duration timer has been started)). Based on a periodic reporting configuration, the UE may report an SSB index and a corresponding layer 1 reference signal received power (L1-RSRP) during an Active Time or during time durations indicated by a DRX ON duration timer, even when the ON duration timer is not started. In some cases, the UE may receive a medium access control (MAC) control element (CE) for WUS control resource set (CORESET) transmission configuration indicator (TCI) updates and tracking reference signal (TRS) reconfiguration, where the TRS is used as a quasi co-location (QCL) reference.

Due to limited resources available for beam management in the above-described reduced capability UE scenarios, the beam may fail outside of the Active Time. In such cases, beam failure detection (BFD) and beam failure recovery (BFR) may not take place in a timely manner. Thus, the UE may not be able to receive a WUS before the BFD and BFR procedures are finished. Due to the high chance of beam failure and delayed BFD/BFR, the performance and user experience may be impacted.

Aspects of the present disclosure provide techniques that may help a UE determine what resources and beams to use when monitoring for WUSs, for example, based on an association between SSBs and beams used for WUS transmissions.

FIG. 13 is a flow diagram illustrating example operations 1300 for wireless communication by a UE. The operations 1300 may be performed, for example, by a UE (e.g., UE 120 of FIG. 1 or FIG. 4) for monitoring for WUSs. The operations 1300 may be implemented as software components that are executed and run on one or more processors (e.g., controller/processor 480 of FIG. 4). Further, the transmission and reception of signals by the UE in operations 1300 may be enabled, for example, by one or more antennas (e.g., antennas 452 of FIG. 4). In certain aspects, the transmission and/or reception of signals by the UE may be implemented via a bus interface of one or more processors (e.g., controller/processor 480 of FIG. 4) obtaining and/or outputting signals.

The operations 1300 begin, in block 1302, by a UE measuring one or more SSBs transmitted from a network entity. In block 1304, the UE determines one or more WUS occasions and receive (RX) beams to monitor based on the SSB measurements. In block 1306, the UE decides to wake up for an ON duration if a WUS is detected in one of the monitored occasions.

FIG. 14 is a flow diagram illustrating example operations 1400 for wireless communication by a network entity. The operations 1400 may be considered complementary to operations 1300 of FIG. 13 and may be performed, for example, by a BS/gNB (e.g., BS 110 of FIG. 1 or FIG. 4) to transmit a WUS to a UE (performing operations 1300). The operations 1400 may be implemented as software components that are executed and run on one or more processors (e.g., controller/processor 440 of FIG. 4). Further, the transmission and reception of signals by the network entity in operations 1400 may be enabled, for example, by one or more antennas (e.g., antennas 434 of FIG. 4). In certain aspects, the transmission and/or reception of signals by the network entity may be implemented via a bus interface of one or more processors (e.g., controller/processor 440 of FIG. 4) obtaining and/or outputting signals.

The operations 1400 begin, in block 1402, by a network entity transmitting SSBs to a user equipment (UE). In block 1404, the network entity determines one or more WUS occasions and transmit (TX) beams for sending WUS based on an association with the SSBs. In block 1406, the network entity transmits one or more WUSs in one or more of the WUS occasions using the determined TX beams.

Figure 15:
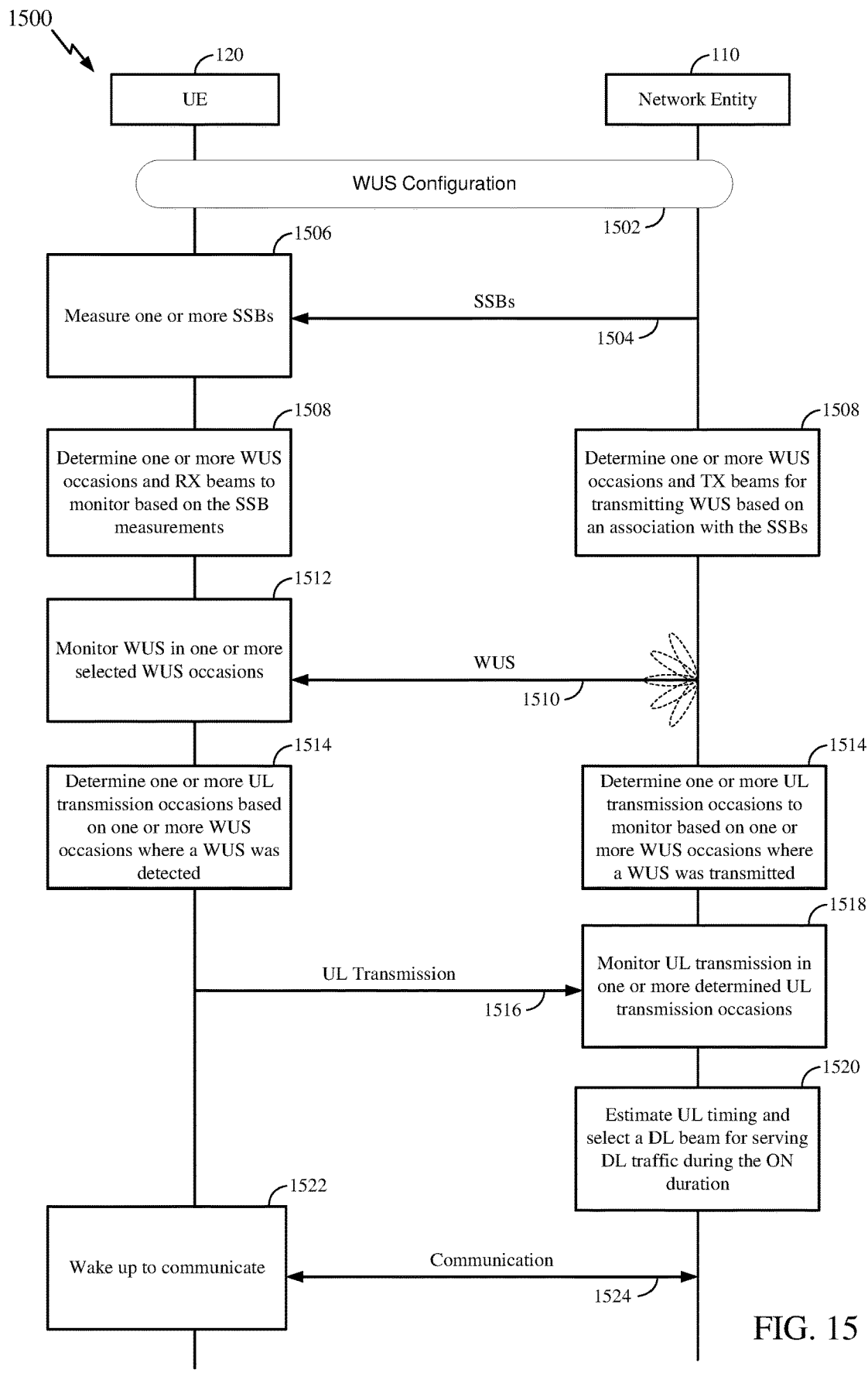
FIG. 15 is a call flow diagram illustrating example SSB-based beam management for WUS monitoring, in accordance with certain aspects of the present disclosure.

Operations 1300 and 1400 of FIGS. 13 and 14 may be understood with reference to diagram 1500 of FIG. 15 which illustrates wake up beam management for reduced capability UEs (e.g., NR light devices). FIG. 15 is a call flow diagram 1500 illustrating example SSB-based beam management for WUS monitoring, in accordance with certain aspects of the present disclosure. The UE 120 illustrated in FIG. 15 may be configured with a C-DRX functionality enabling UE 120 to discontinuously receive data in a connected state (RRC_Connected state) where a radio connection is established between UE 120 and network entity 110 (e.g., BS).

According to aspects of the present disclosure, wake up beams may be associated with corresponding SSBs. Using a similar principle of beam sweeping for paging messages in a 5G network, beam sweeping may be applied to WUS transmissions. In such cases, instead of a configured TCI state, the QCL assumptions (e.g., Type A, B, C, and/or D QCL assumptions) of a wake up control resource set (WU-CORESET) may be determined based on the association with SSBs. A UE may be configured with candidate WUS occasions, each of which is associated with a SSB.

As shown in FIG. 15, at 1502, network entity 110 may configure UE 120 with a WUS configuration indicating a set of candidate WUS occasions. Each WUS occasion may be associated with an SSB.

The number of configured WUS occasions may depend on the number of SSBs (e.g., may be up to the number of SSBs). In some cases, the WUS occasions may be frequency division multiplexed (FDMed) with the associated SSBs (e.g., similar to a remaining minimum system information CORESET monitoring Pattern 3 in a 5G network).

At 1504, network entity 110 may transmit SSBs (associated with the WUS occasions) to UE 120, and at 1506, UE 120 may measure the received SSBs. Given the QCL assumption and SSB to WUS occasion association, based on the SSB measurements, at 1508, UE 120 may determine one or more proper WUS occasions to monitor (as well as one or more RX beams) among the configured candidate WUS occasions.

In some cases, network entity 110 may sweep WUSs on all or a subset of configured WUS occasions for UE 120 using corresponding beams (e.g., corresponding beams used for the associated SSB transmissions). Accordingly, also at 1508, network entity 110 may determine one or more WUS occasions and TX beams for transmitting the one or more WUSs to UE 120 based on the SSB to WUS occasion association. Depending on the implementation, the network entity may choose to use only a subset of the WUS occasions. For example, the network entity may determine how many and on which beam to transmit WUSs based on previously measured or reported link quality (e.g., during the latest Active Time) of the UE.

At 1510, network entity 110 may sweep one or more WUSs in one or more WUS occasions using the determined TX beams. At 1512, UE 120 may monitor for the one or more WUSs in one or more WUS occasions using the determined RX beams.

Where UE 120 detects a WUS (in at least one of the monitored WUS occasions), UE 120 may proceed to wake up for the next DRX ON duration.

Additionally, the one or more WUSs may include at least one field that triggers at least one UL transmission from the UE. At 1514, UE 120 may determine one or more UL transmission occasions based on the one or more WUS occasions where a WUS was detected. Further, also at 1514, network entity may determine one or more UL transmission occasions to monitor based on one or more WUS occasions where network entity 110 transmitted one or more WUSs.

At 1516, UE 120 may transmit one or more UL transmission in one or more UL transmission occasions. At 1518, network entity 110 may monitor for the one or more UL transmissions in one or more UL transmission occasions.

Upon detecting an UL transmission, at 1520, network entity 110 may estimate the UL timing and select a DL beam for serving DL traffic during the DRX ON duration. At 1522, UE 120 may wake up to communicate (because UE 120 detected one or more WUSs in one or more WUS occasions), and at 1524, UE 120 and network entity 110 may communicate in the DRX ON duration (e.g., Active Time).

Figure 16:
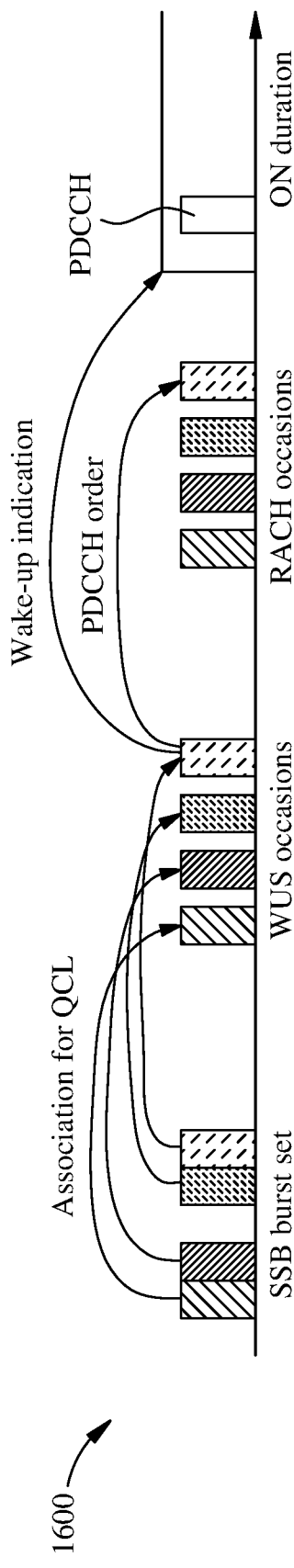
FIGS. 16 and 17 illustrate examples of SSB to resource associations for uplink (UL) transmissions, in accordance with aspects of the present disclosure.
Figure 17:
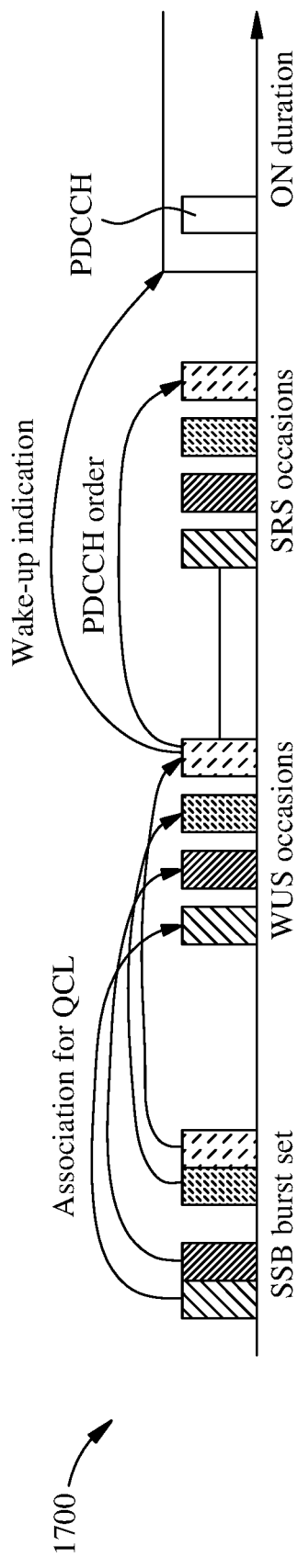

FIGS. 16 and 17 illustrate examples of SSB to resource associations for UL transmissions, in accordance with aspects of the present disclosure.

As illustrated in FIG. 16, in some cases, WUSs may be used as a "group" PDCCH order that triggers a group of UEs receiving the WUSs to transmit random access channel (RACH) transmissions on indicated RACH occasions. In such cases, a field (e.g., a UE-specific field or some other type of field) in the WUS may trigger contention-free RACH transmission occasions. As illustrated in FIG. 16, each RACH occasion may be associated with a WUS occasion (thus, also associated with a SSB). While a one-to-one mapping is illustrated in FIG. 16 (for SSB to WUS occasions, as well as WUS occasions to RACH occasions), in other cases, one-to-many mappings or many-to-one mappings (to conserve resources) may be used.

Upon detecting a RACH preamble transmitted on a RACH occasion, the network entity (e.g., BS) may estimate the UL timing and select a DL beam for serving DL traffic during the Active Time (DRX ON duration). In some cases, a one-to-many mapping may allow for multiple RACH occasions for repetition or power ramping.

In some cases, where a UE has detected multiple WUSs in different configured WUS occasions, the UE may transmit multiple RACHs on multiple associated RACH occasions. In such cases, the maximum number of RACHs may be configurable. In some cases, the maximum number of RACHs may be related to a number of different DL beams that may be used during the Active Time.

As illustrated in FIG. 17, instead of or in addition to a RACH transmissions, a UE may transmit one or more SRSs on one or more of configured SRS occasions. In some cases, WUSs may serve as an aperiodic SRS (A-SRS) trigger. In some cases, a number of SRS ports may indicate a maximum rank that the UE prefers for the selected beam. The UE may derive this preferred rank, for example, from SSB measurement. The network entity may determine the number of ports by blind decoding and, thus, infer the maximum rank preferred by the UE.

In some cases, the UE may also send other UL signals, instead of or in addition to RACH and/or SRS transmissions. Examples of such UL signals may include PUCCH or PUSCH (e.g., via PUSCH resources of a configured-grant). In such cases, the PUCCH and/or PUSCH payload may include CSI feedback (e.g., including channel quality indicator (CQI), pre-coding matrix indicator (PMI), rank indicator (RI), etc.) that the UE derived from the SSB measurements.

Example Wireless Communication Devices

Figure 18:
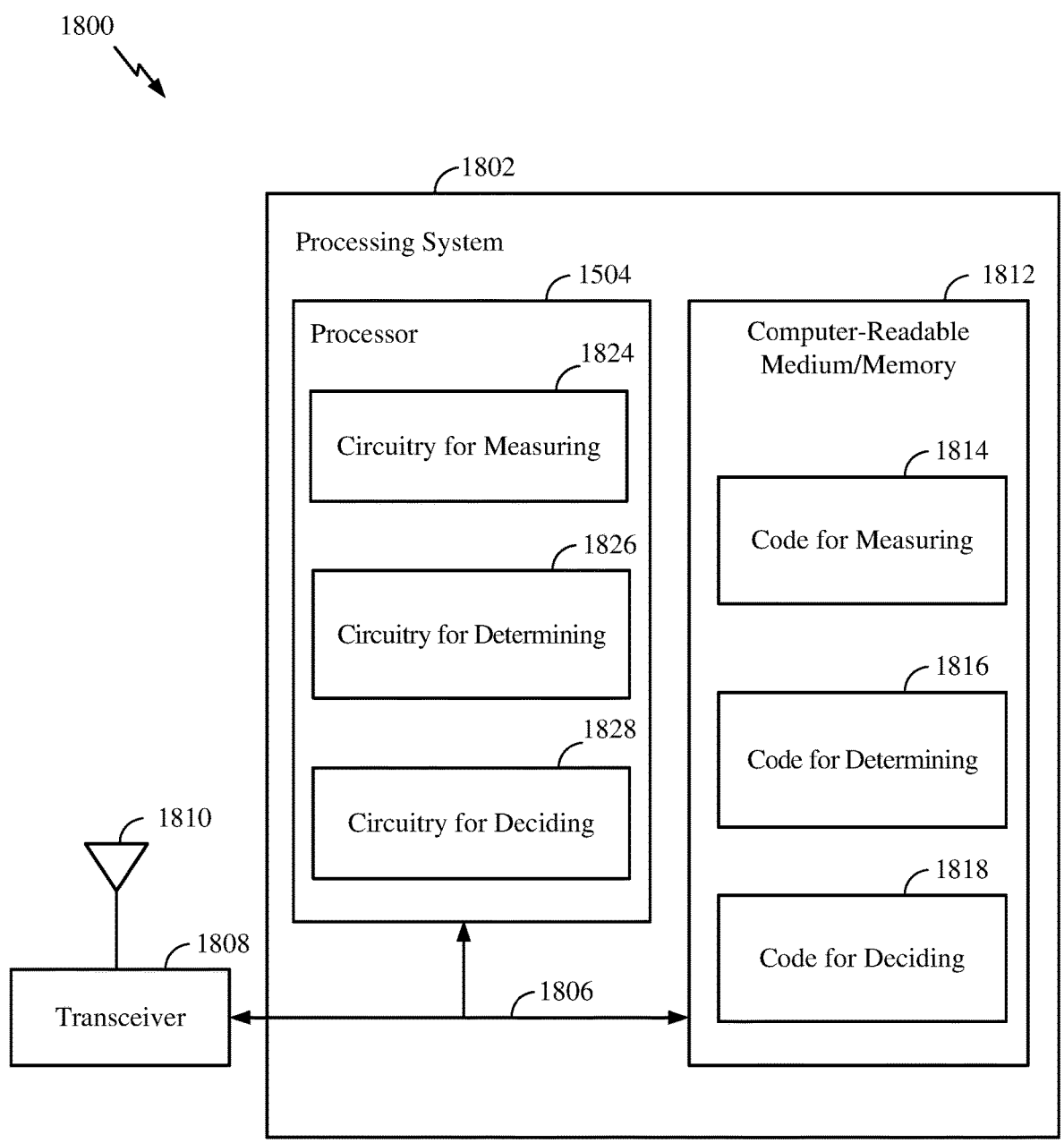
FIG. 18 illustrates a communications device that may include various components configured to perform operations for the techniques disclosed herein in accordance with aspects of the present disclosure.

FIG. 18 illustrates a communications device 1800 that may include various components (e.g., corresponding to means-plus-function components) configured to perform operations for the techniques disclosed herein, such as the operations illustrated in FIG. 13.

Communications device 1800 includes a processing system 1802 coupled to a transceiver 1808 (e.g., a transmitter and/or a receiver). Transceiver 1808 is configured to transmit and receive signals for the communications device 1800 via an antenna 1810, such as the various signals as described herein. Processing system 1802 may be configured to perform processing functions for the communications device 1800, including processing signals received and/or to be transmitted by the communications device 1800.

Processing system 1802 includes a processor 1804 coupled to a computer-readable medium/memory 1812 via a bus 1806. In certain aspects, computer-readable medium/memory 1812 is configured to store instructions (e.g., computer-executable code) that when executed by the processor 1804, cause the processor 1804 to perform the operations illustrated in FIG. 13, or other operations for performing the various techniques discussed herein. In some cases, the processor 1804 can include one or more components of UE 120 with reference to FIG. 4 such as, for example, controller/processor 480, transmit processor 464, receive processor 458, and/or the like. Additionally, in some cases, computer-readable medium 1812 can include one or more components of UE 120 with reference to FIG. 4 such as, for example, memory 482 and/or the like.

In certain aspects, computer-readable medium/memory 1812 stores code 1814 for measuring; code 1816 for determining; and code 1818 for deciding.

In some cases, code 1814 for measuring may include code for measuring one or more synchronization signal blocks (SSBs) transmitted from a network entity.

In some cases, code 1816 for measuring may include code for determining one or more wake up signal (WUS) occasions and receive (RX) beams to monitor based on the SSB measurements.

In some cases, code 1818 for measuring may include code for deciding to wake up for an ON duration if a WUS is detected in one of the monitored occasions.

In certain aspects, processor 1804 has circuitry configured to implement the code stored in the computer-readable medium/memory 1812. For example, processor 1804 includes circuitry 1824 for measuring; circuitry 1826 for determining; and circuitry 1828 for deciding.

In some cases, circuitry 1824 for measuring may include circuitry for measuring one or more synchronization SSBs transmitted from a network entity.

In some cases, circuitry 1826 for measuring may include circuitry for determining one or more WUS occasions and RX beams to monitor based on the SSB measurements.

In some cases, circuitry 1828 for measuring may include circuitry for deciding to wake up for an ON duration if a WUS is detected in one of the monitored occasions.

In some cases, the operations illustrated in FIG. 13, as well as other operations described herein, may be implemented by one or more means-plus-function components. For example, in some cases, such operations may be implemented by means for measuring, means for determining, and means for deciding.

In some cases, means for measuring, means for determining, and means for deciding, includes a processing system, which may include one or more processors, such as the receive processor 458, the transmit processor 464, the TX MIMO processor 466, and/or the controller/processor 480 of the UE 120 illustrated in FIG. 4 and/or the processing system 1802 of the communication device 1800 in FIG. 18.

Figure 19:
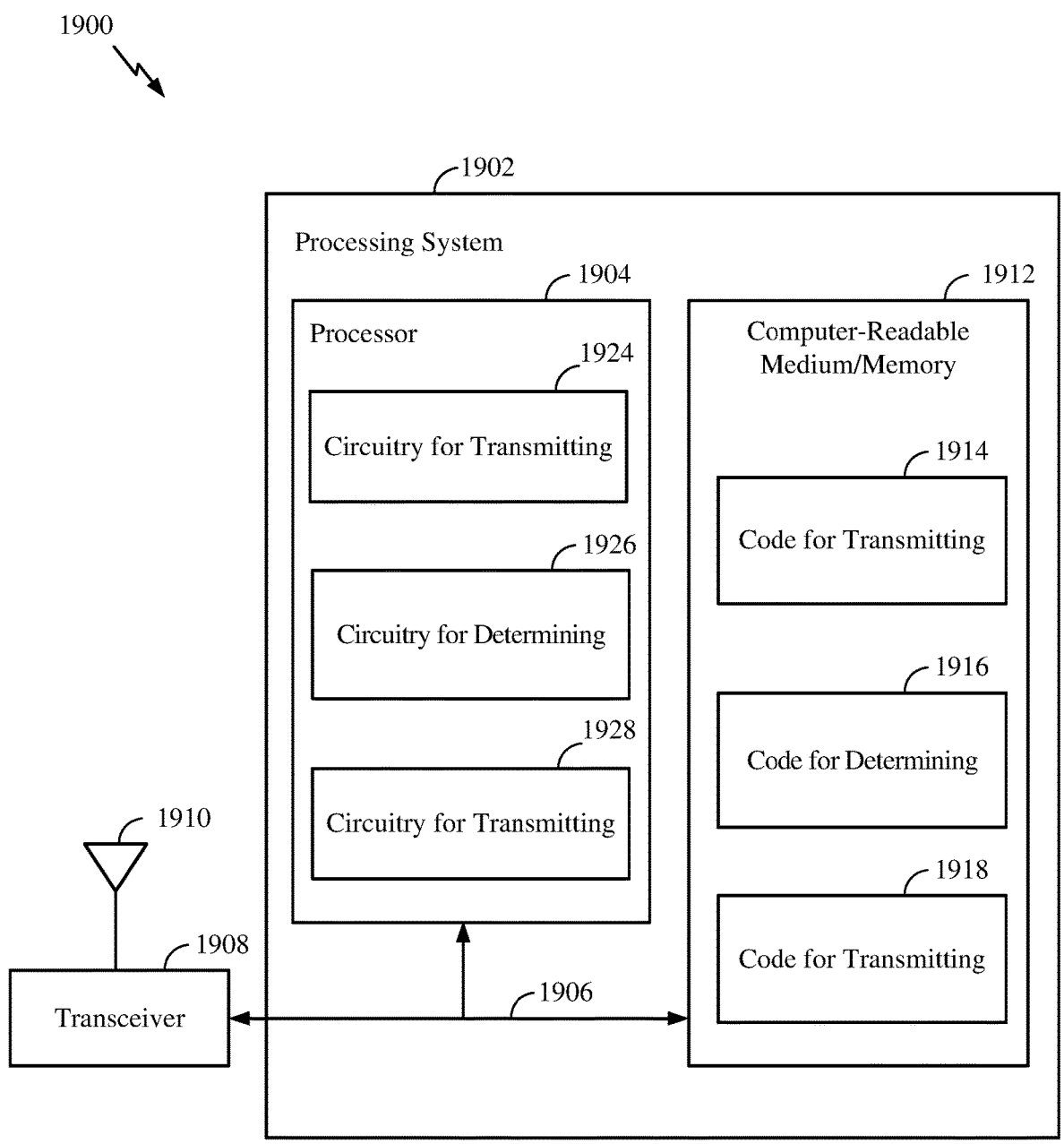
FIG. 19 illustrates a communications device that may include various components configured to perform operations for the techniques disclosed herein in accordance with aspects of the present disclosure.

FIG. 19 illustrates a communications device 1900 that may include various components (e.g., corresponding to means-plus-function components) configured to perform operations for the techniques disclosed herein, such as the operations illustrated in FIG. 14.

Communications device 1900 includes a processing system 1902 coupled to a transceiver 1908 (e.g., a transmitter and/or a receiver). Transceiver 1908 is configured to transmit and receive signals for the communications device 1900 via an antenna 1910, such as the various signals as described herein. Processing system 1902 may be configured to perform processing functions for the communications device 1900, including processing signals received and/or to be transmitted by the communications device 1900.

Processing system 1902 includes a processor 1904 coupled to a computer-readable medium/memory 1912 via a bus 1906. In certain aspects, computer-readable medium/memory 1912 is configured to store instructions (e.g., computer-executable code) that when executed by the processor 1904, cause the processor 1904 to perform the operations illustrated in FIG. 14, or other operations for performing the various techniques discussed herein. In some cases, the processor 1904 can include one or more components of BS 110 with reference to FIG. 4 such as, for example, controller/processor 440, transmit processor 420, receive processor 438, and/or the like. Additionally, in some cases, the computer-readable medium/memory 1412 can include one or more components of BS 110 with reference to FIG. 4 such as, for example, memory 442 and/or the like.

In certain aspects, computer-readable medium/memory 1912 stores code 1914 for transmitting; code 1916 for determining; and code 1918 for transmitting.

In some cases, code 1914 for transmitting may include code for transmitting SSBs to a UE.

In some cases, code 1916 for determining may include code for determining one or more WUS occasions and transmit (TX) beams for transmitting WUS based on the SSB measurements.

In some cases, code 1918 for transmitting may include code for transmitting WUS in one or more of the WUS occasions using the determined TX beams.

In certain aspects, processor 1904 has circuitry configured to implement the code stored in the computer-readable medium/memory 1912. For example, processor 1904 includes circuitry 1924 for transmitting; circuitry 1926 for determining; and circuitry 1928 for transmitting.

In some cases, circuitry 1924 for transmitting may include circuitry for transmitting SSBs to a UE.

In some cases, circuitry 1926 for determining may include circuitry for determining one or more WUS occasions and TX beams for transmitting WUS based on the SSB measurements.

In some cases, circuitry 1928 for transmitting may include circuitry for transmitting WUS in one or more of the WUS occasions using the determined TX beams.

In some cases, the operations illustrated in FIG. 14, as well as other operations described herein, may be implemented by one or more means-plus-function components. For example, in some cases, such operations may be implemented by means for transmitting (or means for outputting for transmission) and means for determining.

In some cases, means for transmitting (or means for outputting for transmission) includes a transmitter and/or an antenna(s) 434 or the BS 110 illustrated in FIG. 4 and/or circuitry 1924 and 1928 for transmitting of the communication device 1900 in FIG. 19.

In some cases, means for determining includes a processing system, which may include one or more processors, such as the receive processor 438, the transmit processor 420, the TX MIMO processor 430, and/or the controller/processor 440 of the BS 110 illustrated in FIG. 4 and/or the processing system 1902 of the communication device 1900 in FIG. 19.

Example Clauses

Implementation examples are described in the following numbered clauses:

Clause 1: A method of wireless communication by a user equipment (UE), comprising: measuring one or more synchronization signal blocks (SSBs) transmitted from a network entity; determining one or more wake up signal (WUS) occasions and receive (RX) beams to monitor based on the SSB measurements; and deciding to wake up for an ON duration when a WUS is detected in one of the WUS occasions.

Clause 2: The method of Clause 1, wherein the one or more WUS occasions are frequency division multiplexed (FDMed) with one or more associated SSBs.

Clause 3: The method of Clause 1 or 2, further comprising determining quasi co-location (QCL) information for a control resource set (CORESET) of the WUS occasions based on an association with the SSBs.

Clause 4: The method of any of Clauses 1-3, wherein the UE is configured with a set of candidate WUS occasions, each associated with an SSB and the UE selects one or more of the candidate WUS occasions to monitor based on the SSB measurements.

Clause 5: The method of any of Clauses 1-4, further comprising detecting, in one of the WUS occasions, a WUS with at least one field that triggers at least one uplink (UL) transmission from the UE.

Clause 6: The method of Clause 5, wherein the UL transmission comprises a random access channel (RACH) transmission and the UE determines at least one RACH occasion for the RACH transmission based on an association with the WUS occasion.

Clause 7: The method of Clause 6, wherein the at least one RACH occasion comprises multiple RACH occasions for at least one of repetition or power ramping.

Clause 8: The method of Clause 6 or 7, wherein the UE detects multiple WUSs in different WUS occasions and transmits multiple RACH transmissions in multiple RACH occasions.

Clause 9: The method of any of Clauses 5-8, wherein when the UL transmission comprises one or more sounding reference signal (SRS) transmissions the UE detects one or more WUSs in different WUS occasions, determines one or more SRS occasions for the one or more SRS transmissions based on an association with the one or more WUS occasions, and transmits the one more SRS transmission in the one or more SRS occasions.

Clause 10: The method of any of Clauses 5-9, wherein when the UL transmission comprises one or more physical uplink control channel (PUCCH) or physical uplink shared channel (PUSCH) transmissions, the UE detects one or more WUSs in different WUS occasions, determines one or more PUCCH occasions or one or more PUSCH occasions for the one or more PUCCH or PUSCH transmissions based on an association with the WUS occasions, and transmits the one more PUCCH or PUSCH transmission in the one or more PUCCH or PUSCH occasions.

Clause 11: The method of Clause 10, further comprising determining a channel state information (CSI) based on the SSB measurements and reporting the CSI through a payload of the PUCCH or PUSCH.

Clause 12: The method of any of Clauses 9-11, further comprising determining a preferred maximum rank based on the SSB measurements and providing an indication of the preferred maximum rank based on a number of SRS ports for the one or more SRS transmissions.

Clause 13: A method of wireless communication by a network entity, comprising transmitting synchronization signal blocks (SSBs) to a user equipment (UE), determining one or more wake up signal (WUS) occasions and transmit (TX) beams for sending one or more WUSs based on an association with the SSBs, and transmitting the one or more WUSs in one or more of the WUS occasions using the determined TX beams.

Clause 14: The method of Clause 13, wherein the one or more WUS occasions are frequency division multiplexed (FDMed) with one or more associated SSBs.

Clause 15: The method of Clause 13 or 14, further comprising determining quasi co-location (QCL) information for a control resource set (CORESET) of the WUS occasions based on an association with the SSBs.

Clause 16: The method of any of Clauses 13-15, further comprising configuring the UE with a set of candidate WUS occasions, each associated with an SSB and transmitting the UE a WUS on one or more of the candidate WUS occasions.

Clause 17: The method of any of Clauses 13-16, wherein the network entity sweeps the one or more WUSs on all or a subset of configured WUS occasions using corresponding beams.

Clause 18: The method of Clause 17, wherein the network entity selects how many and on which beams to transmit the one or more WUSs based on previously measured link quality of the UE.

Clause 19: The method of any of Clauses 13-18, wherein the transmitted one or more WUSs have at least one UE-specific field that triggers at least one uplink (UL) transmission from the UE.

Clause 20: The method of Clause 19, wherein the UL transmission comprises a random access channel (RACH) transmission and the network entity determines at least one RACH occasion to monitor for the RACH transmission based on an association with the WUS occasion.

Clause 21: The method of Clause 20, wherein the at least one RACH occasion comprises multiple RACH occasions for at least one of repetition or power ramping.

Clause 22: The method of any of Clauses 19-21, wherein the network entity transmits multiple WUSs in different WUS occasions and monitors multiple RACH occasions for RACH transmissions from the UE.

Clause 23: The method of any of Clauses 19-22, wherein the UL transmission comprises one or more sounding reference signal (SRS) transmission, the network entity determines one or more SRS occasions to monitor for the one or more SRS transmissions based on an association with the one or more WUS occasions, and monitors for the one or more SRS transmissions in the one or more SRS occasions.

Clause 24: The method of any of Clauses 19-23, wherein the UL transmission comprises one or more physical uplink control channel (PUCCH) transmissions or one or more physical uplink shared channel (PUSCH) transmissions, the network entity determines one or more PUCCH or PUSCH occasions to monitor for the one or more PUCCH or PUSCH transmissions based on an association with the one or more WUS occasions, and monitors for the one or more PUCCH or PUSCH transmissions in the one or more PUCCH or PUSCH occasions.

Clause 25: The method of Clause 24, further comprising receiving through a payload of the PUCCH or PUSCH, from the UE, reporting of channel state information (CSI) based on SSB measurements.

Clause 26: The method of any of Clauses 23-25, further comprising determining a preferred maximum rank based on SSB measurements and providing an indication of the preferred maximum rank based on a number of SRS ports for the one or more SRS transmissions.

Clause 27: An apparatus for wireless communication by a user equipment (UE), comprising a receiver configured to measure one or more synchronization signal blocks (SSBs) transmitted from a network entity and at least one processor configured to determine one or more wake up signal (WUS) occasions and receive (RX) beams to monitor based on the SSB measurements and decide to wake up for an ON duration when a WUS is detected in one of the WUS occasions.

Clause 28: The apparatus of Clause 27, wherein the one or more WUS occasions are frequency division multiplexed (FDMed) with one or more associated SSBs.

Clause 29: An apparatus for wireless communication by a network entity, comprising a transmitter configured to transmit synchronization signal blocks (SSBs) to a user equipment (UE) and at least one processor configured to determine one or more wake up signal (WUS) occasions and transmit (TX) beams for sending one or more WUSs based on an association with the SSBs, wherein the transmitter is further configured to transmit the one or more WUSs in one or more of the WUS occasions using the determined TX beams.

Clause 30: The apparatus of Clause 29, wherein the one or more WUS occasions are frequency division multiplexed (FDMed) with one or more associated SSBs.

Additional Considerations

The preceding description provides examples of wake-up beam management. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 5G (e.g., 5G NR), 3GPP Long Term Evolution (LTE), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

LTE and LTE-A-) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module.

Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 13 and FIG. 14.

Further, it should be appreciated that modules and/or other appropriate means for performing the methods and techniques described herein can be downloaded and/or otherwise obtained by a user terminal and/or BS as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or BS can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), the method comprising:
measuring one or more synchronization signal blocks (SSBs) transmitted from a network entity;
determining one or more wake up signal (WUS) occasions and receive (RX) beams to monitor based on the SSB measurements;
determining quasi co-location (QCL) information for a control resource set (CORESET) of the WUS occasions based on an association with the SSBs; and
waking up for an ON duration when a WUS is detected in one of the WUS occasions.

2. The method of claim 1, wherein the one or more WUS occasions are frequency division multiplexed (FDMed) with one or more associated SSBs.

3. The method of claim 1, wherein:
the UE is configured with a set of candidate WUS occasions, each associated with an SSB; and
the UE selects one or more of the candidate WUS occasions to monitor based on the SSB measurements.

4. The method of claim 1, further comprising:
detecting, in one of the WUS occasions, a WUS with at least one field that triggers at least one uplink (UL) transmission from the UE.

5. The method of claim 4, wherein:
the UL transmission comprises a random access channel (RACH) transmission; and
the UE determines at least one RACH occasion for the RACH transmission based on an association with the WUS occasion.

6. The method of claim 5, wherein the UE:
detects multiple WUSs in different WUS occasions; and
transmits multiple RACH transmissions in multiple RACH occasions.

7. The method of claim 4, wherein when the UL transmission comprises one or more sounding reference signal (SRS) transmissions, the UE:
detects one or more WUSs in different WUS occasions;
determines one or more SRS occasions for the one or more SRS transmissions based on an association with the one or more WUS occasions; and
transmits the one more SRS transmission in the one or more SRS occasions.

8. The method of claim 7, further comprising:
determining a preferred maximum rank based on the SSB measurements; and
providing an indication of the preferred maximum rank based on a number of SRS ports for the one or more SRS transmissions.

9. The method of claim 4, wherein when the UL transmission comprises one or more physical uplink control channel (PUCCH) or physical uplink shared channel (PUSCH) transmissions, the UE:
detects one or more WUSs in different WUS occasions;
determines one or more PUCCH occasions or one or more PUSCH occasions for the one or more PUCCH or PUSCH transmissions based on an association with the WUS occasions; and
transmits the one more PUCCH or PUSCH transmission in the one or more PUCCH or PUSCH occasions.

10. The method of claim 9, further comprising:
determining a channel state information (CSI) based on the SSB measurements; and
reporting the CSI through a payload of the PUCCH or PUSCH.

11. A method of wireless communication by a network entity, the method comprising:
transmitting synchronization signal blocks (SSBs) to a user equipment (UE);
determining one or more wake up signal (WUS) occasions and transmit (TX) beams for sending one or more WUSs based on an association with the SSBs;

determining quasi co-location (QCL) information for a control resource set (CORESET) of the WUS occasions based on an association with the SSBs; and transmitting the one or more WUSs in one or more of the WUS occasions using the determined TX beams.

12. The method of claim 11, wherein the one or more WUS occasions are frequency division multiplexed (FDMed) with one or more associated SSBs.

13. The method of claim 11, further comprising:

configuring the UE with a set of candidate WUS occasions, each associated with an SSB; and transmitting to the UE a WUS on one or more of the candidate WUS occasions.

14. The method of claim 11, further comprising sweeping the one or more WUSs on all or a subset of configured WUS occasions using corresponding beams.

15. The method of claim 14, further comprising selecting how many and on which beams to transmit the one or more WUSs based on previously measured link quality of the UE.

16. The method of claim 11, wherein the transmitted one or more WUSs have at least one UE-specific field that triggers at least one uplink (UL) transmission from the UE.

17. The method of claim 16, wherein when the UL transmission comprises a random access channel (RACH) transmission, the method further comprises:

determining at least one RACH occasion to monitor for the RACH transmission based on an association with the WUS occasion.

18. The method of claim 16, further comprising:

transmitting multiple WUSs in different WUS occasions; and monitoring multiple RACH occasions for RACH transmissions from the UE.

19. The method of claim 16, wherein when the UL transmission comprises one or more sounding reference signal (SRS) transmission, the method further comprises:

determining one or more SRS occasions to monitor for the one or more SRS transmissions based on an association with the one or more WUS occasions; and monitoring for the one or more SRS transmissions in the one or more SRS occasions.

20. The method of claim 19, further comprising:

determining a preferred maximum rank based on SSB measurements; and providing an indication of the preferred maximum rank based on a number of SRS ports for the one or more SRS transmissions.

21. The method of claim 16, wherein when the UL transmission comprises one or more physical uplink control channel (PUCCH) transmissions or one or more physical uplink shared channel (PUSCH) transmissions, the method further comprises:

determining one or more PUCCH or PUSCH occasions to monitor for the one or more PUCCH or PUSCH transmissions based on an association with the one or more WUS occasions; and monitoring for the one or more PUCCH or PUSCH transmissions in the one or more PUCCH or PUSCH occasions.

22. The method of claim 21, further comprising:

receiving through a payload of the PUCCH or PUSCH, from the UE, reporting of channel state information (CSI) based on SSB measurements.

23. An apparatus for wireless communication by a user equipment (UE), comprising:

a receiver configured to:

measure one or more synchronization signal blocks (SSBs) transmitted from a network entity; and one or more processors, individually or collectively, configured to:

determine one or more wake up signal (WUS) occasions and receive (RX) beams to monitor based on the SSB measurements;

determine quasi co-location (QCL) information for a control resource set (CORESET) of the WUS occasions based on an association with the SSBs; and wake up for an ON duration when a WUS is detected in one of the WUS occasions.

24. The apparatus of claim 23, wherein the one or more WUS occasions are frequency division multiplexed (FDMed) with one or more associated SSBs.

25. An apparatus for wireless communication by a network entity, comprising:

a transmitter configured to:

transmit synchronization signal blocks (SSBs) to a user equipment (UE); and one or more processors, individually or collectively, configured to:

determine one or more wake up signal (WUS) occasions and transmit (TX) beams for sending one or more WUSs based on an association with the SSBs; and determine quasi co-location (QCL) information for a control resource set (CORESET) of the WUS occasions based on an association with the SSBs, wherein the transmitter is further configured to transmit the one or more WUSs in one or more of the WUS occasions using the determined TX beams.

26. The apparatus of claim 25, wherein the one or more WUS occasions are frequency division multiplexed (FDMed) with one or more associated SSBs.

* * * * *